Aug. 9, 1932.  J. M. HOTHERSALL  1,870,728
APPARATUS FOR MAKING LEVER OPENER CONTAINER PARTS
Filed Dec. 30, 1929  22 Sheets-Sheet 1

INVENTOR
John M. Hothersall
BY
John C. Carpenter
ATTORNEY

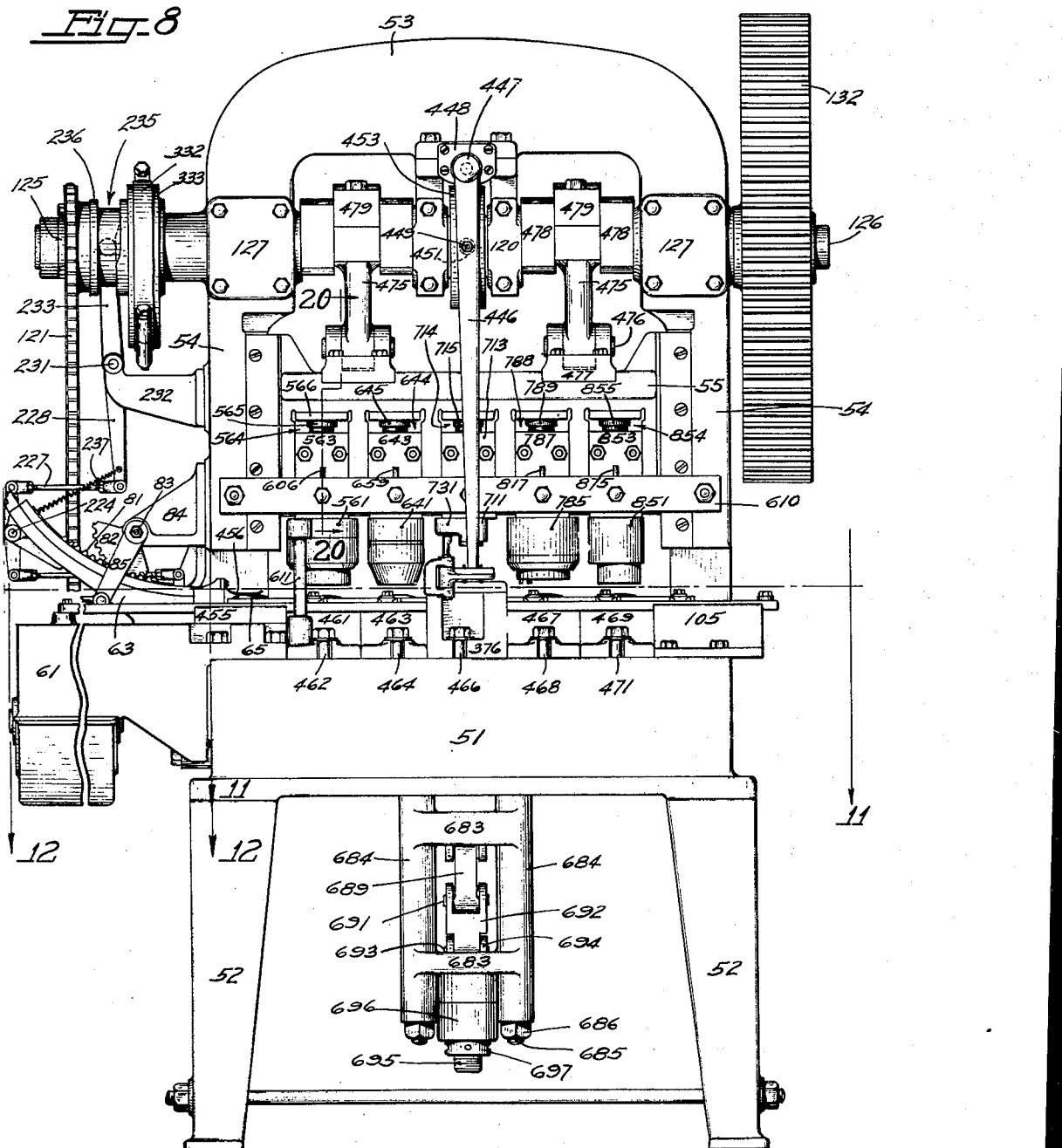

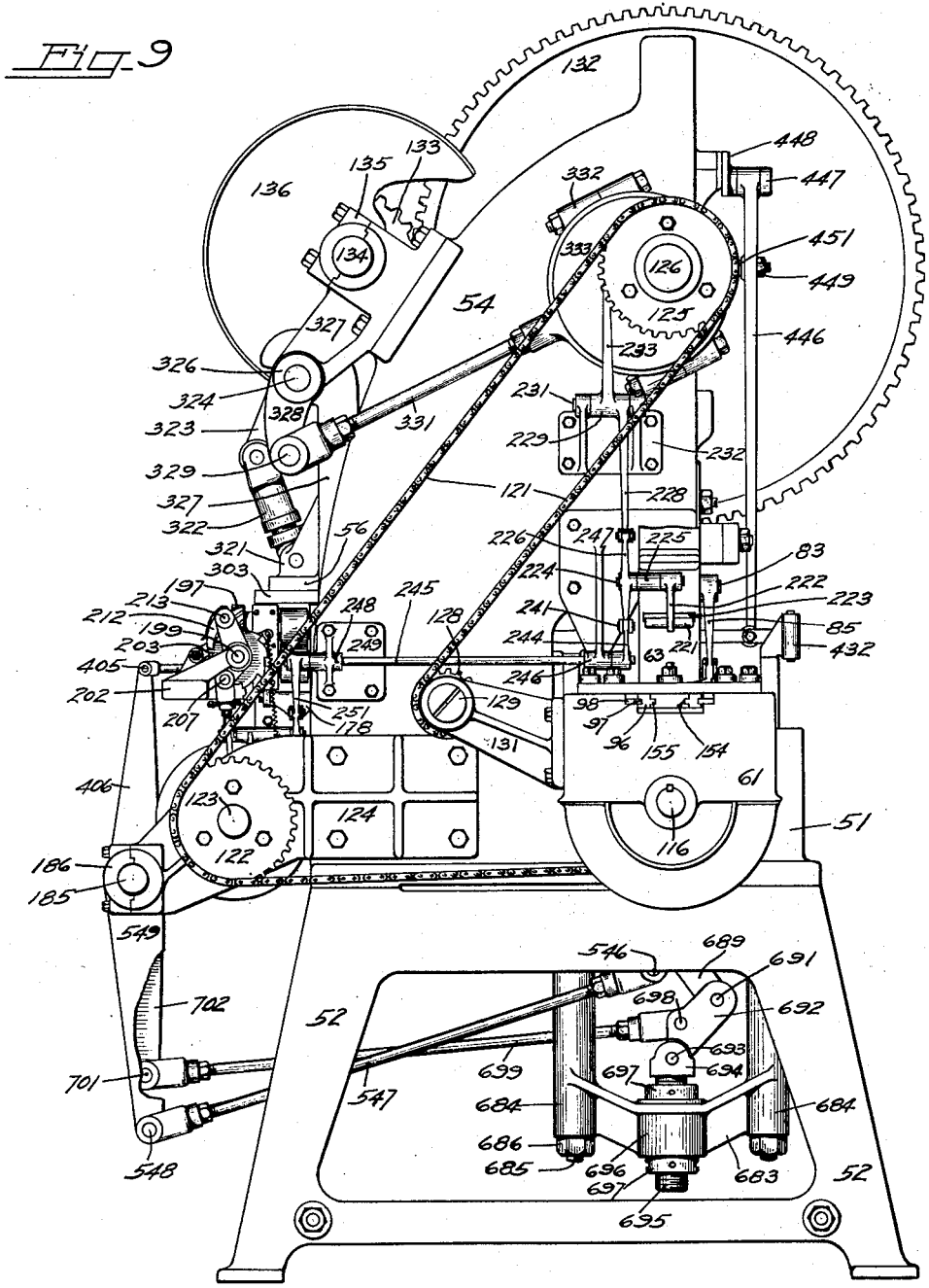

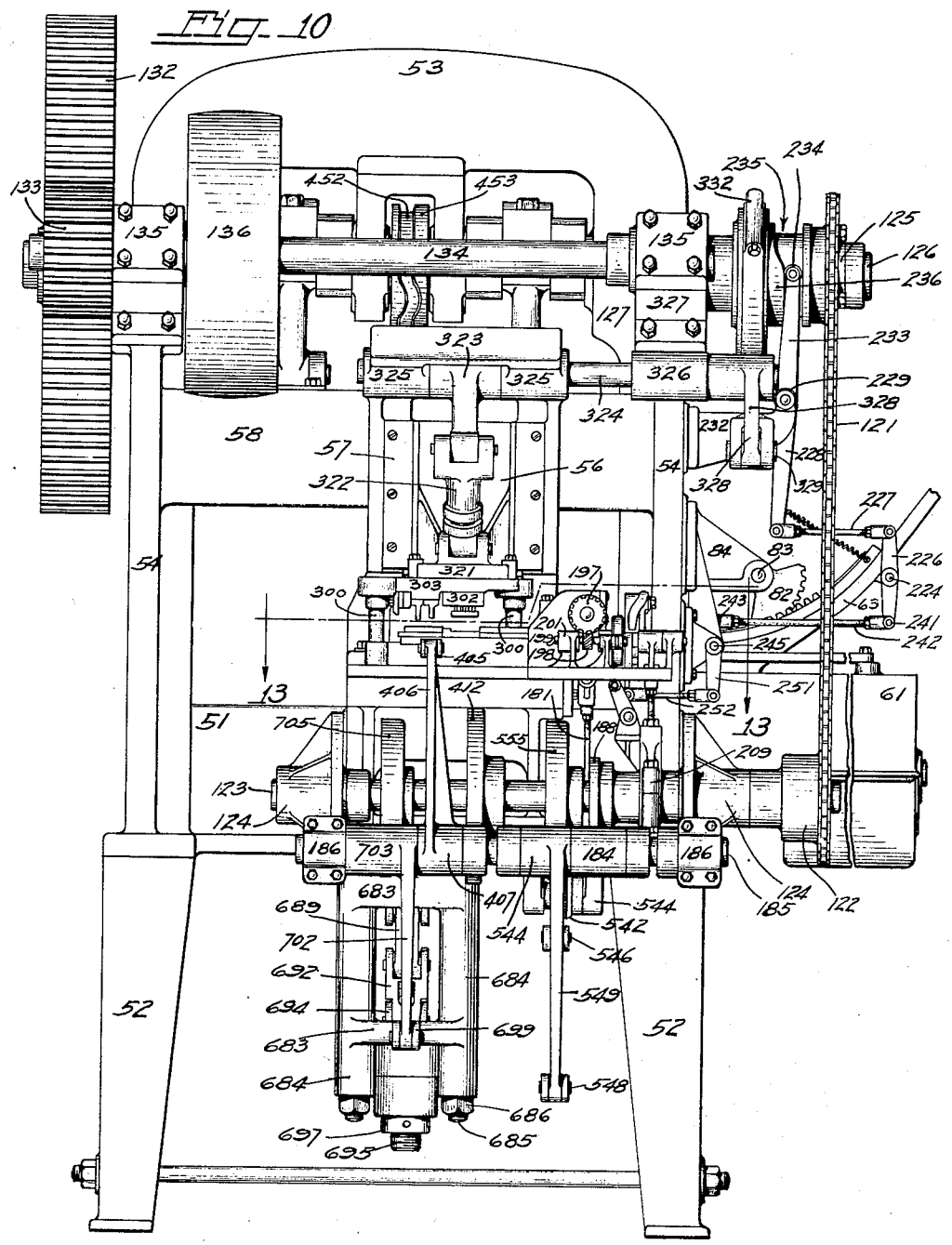

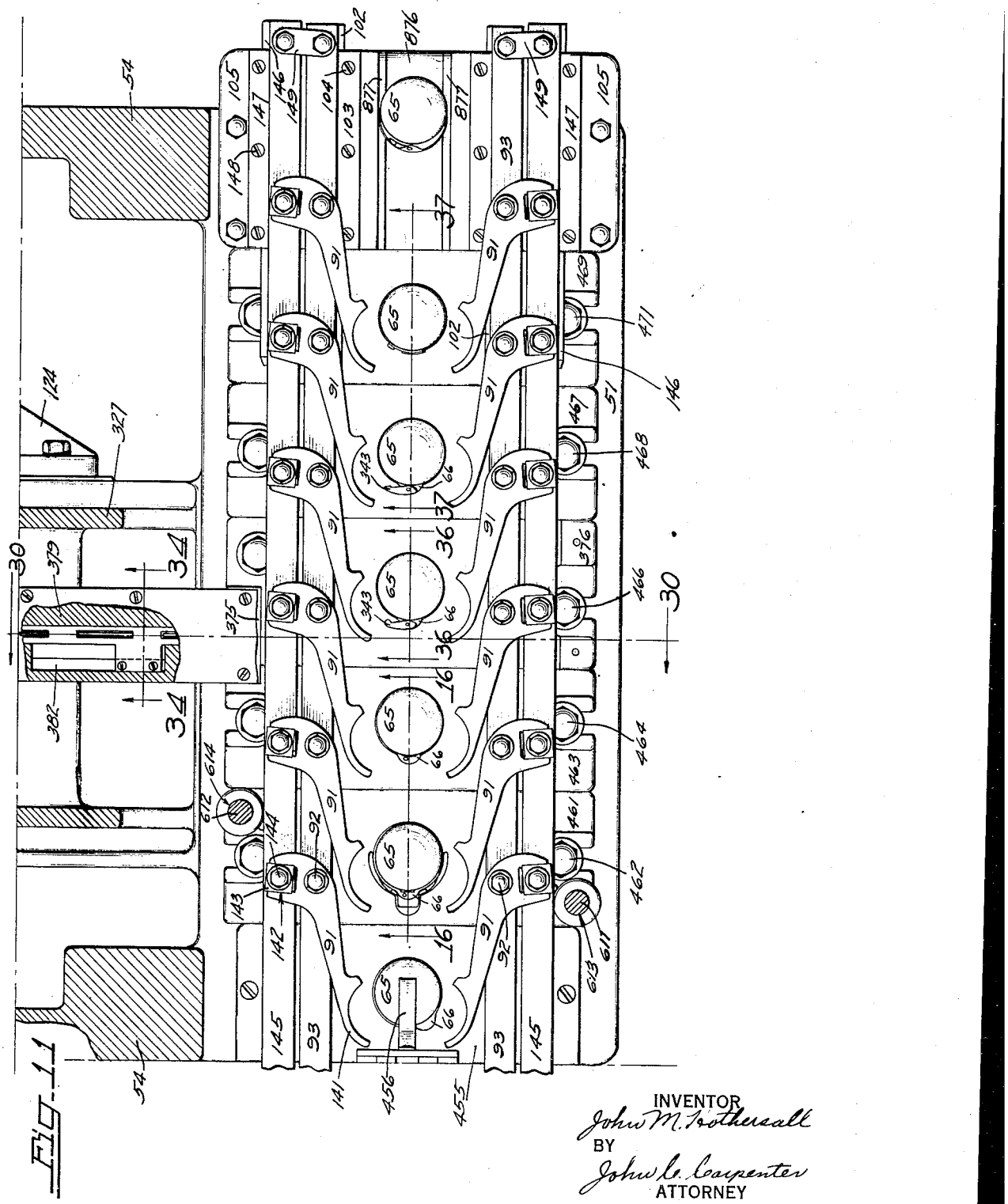

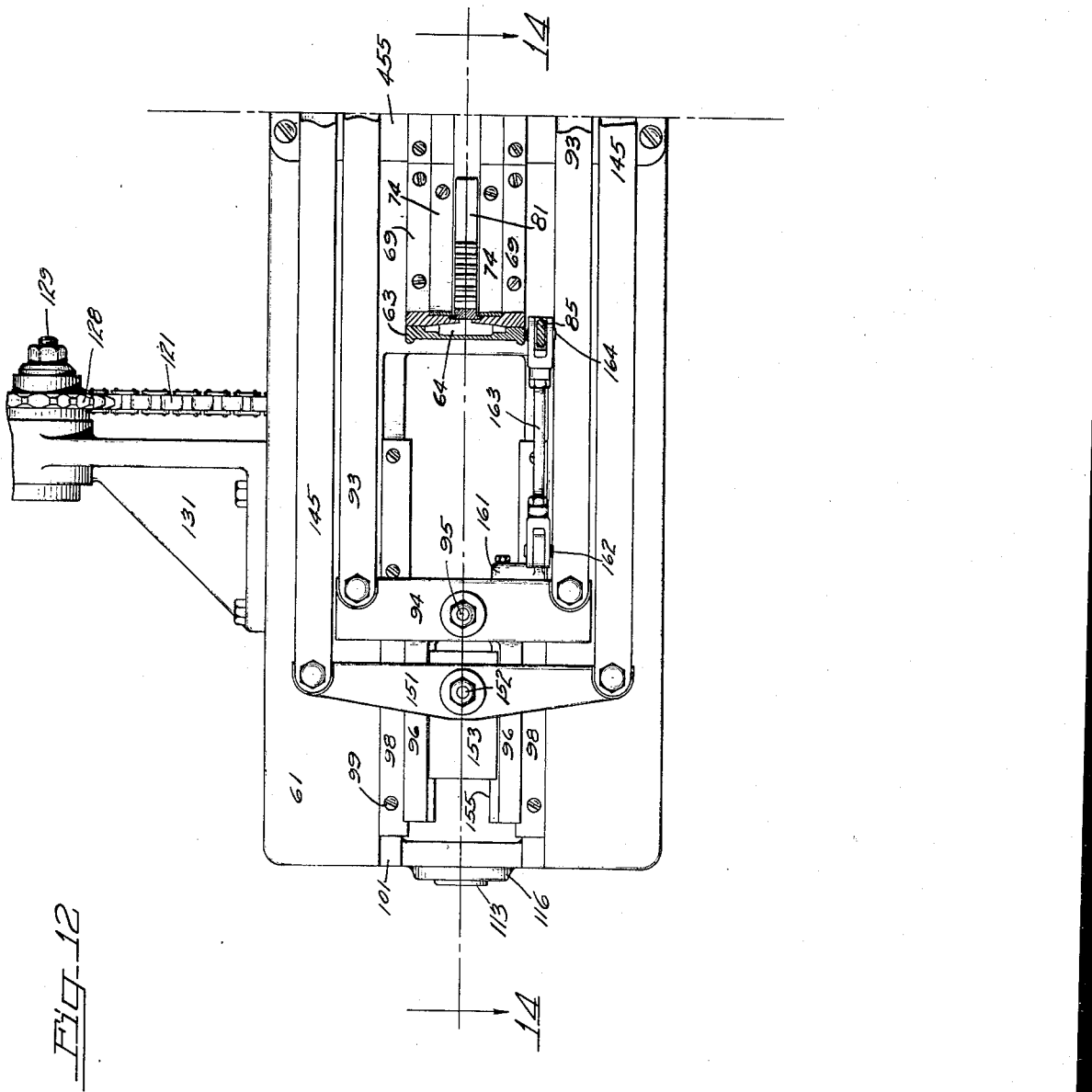

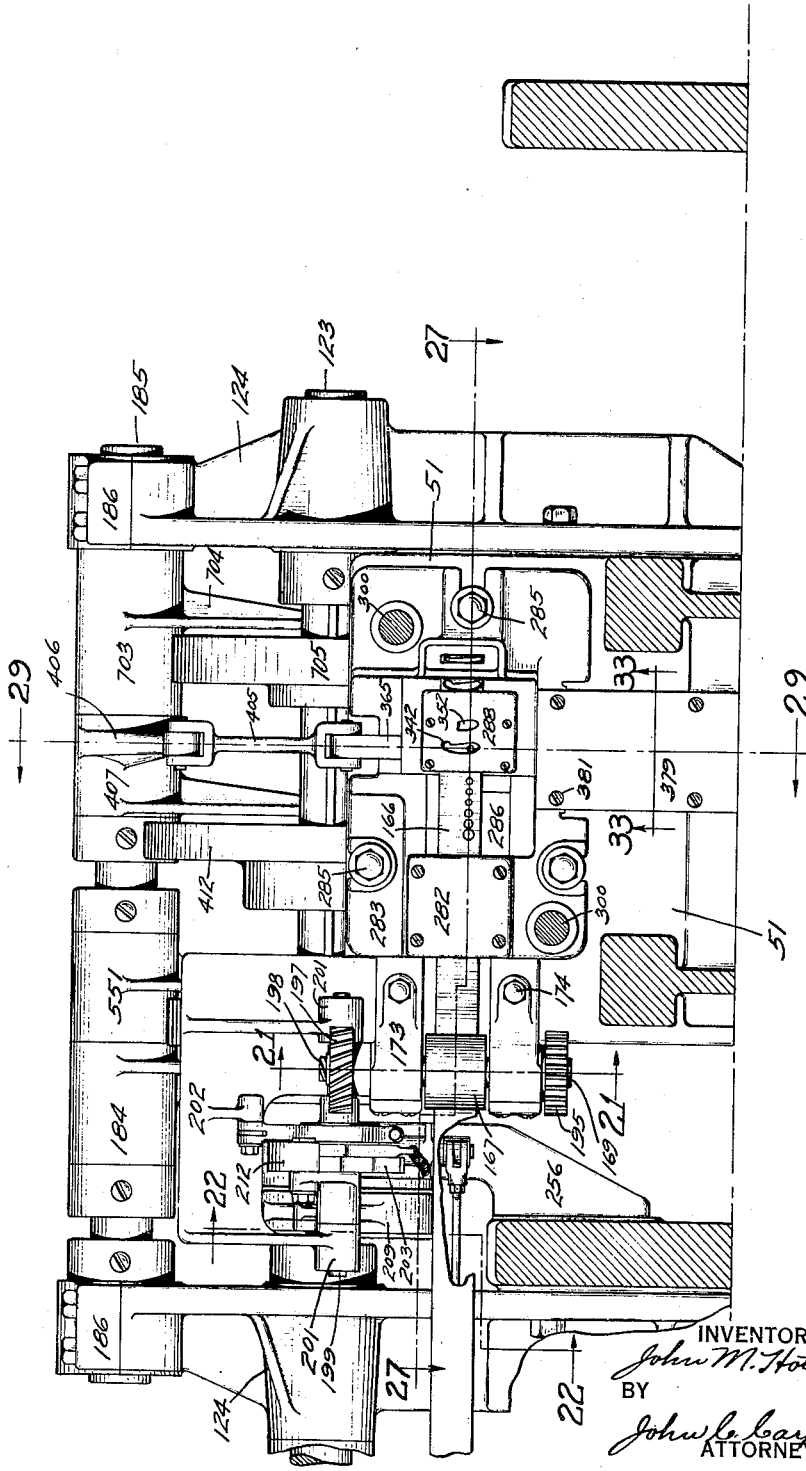

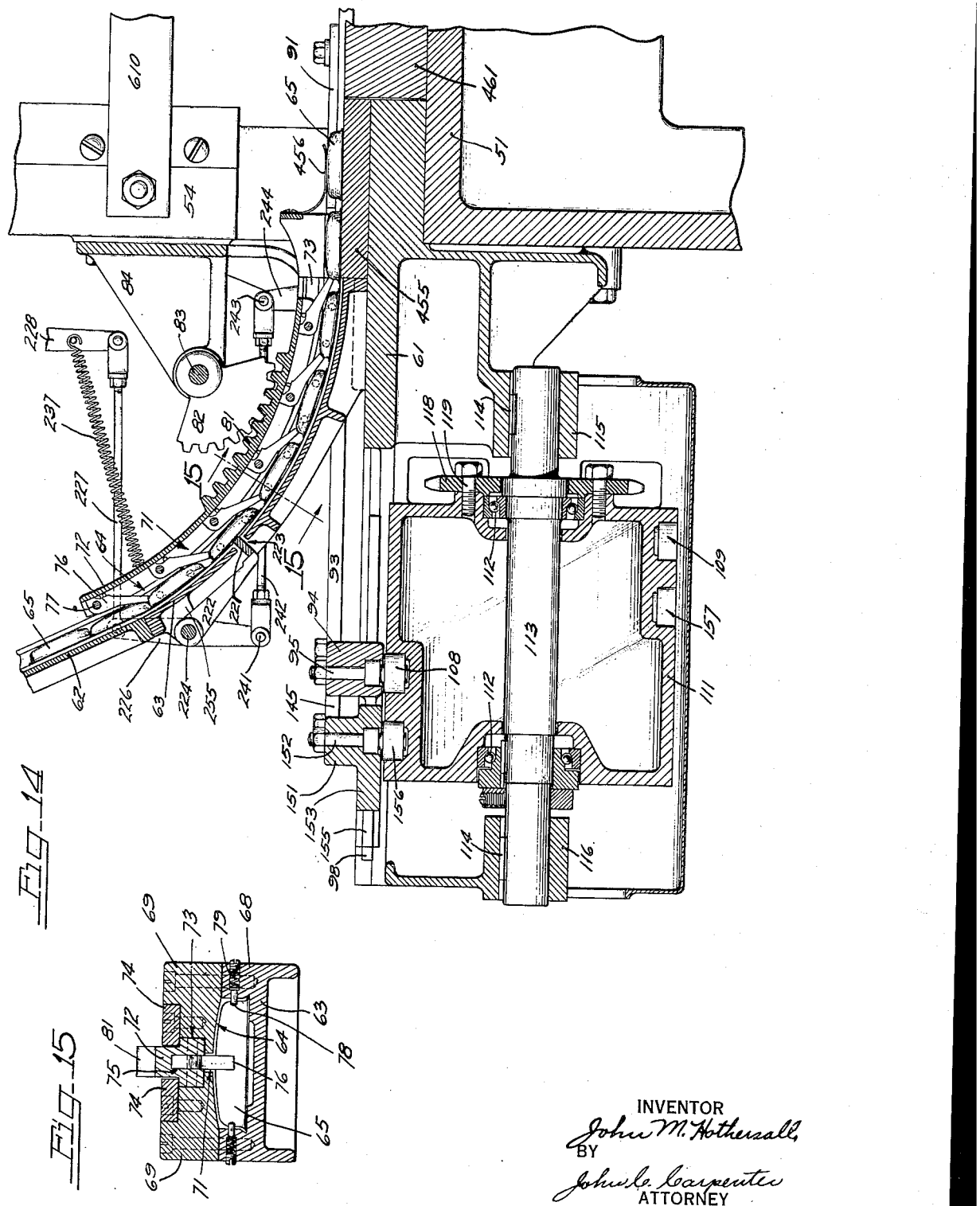

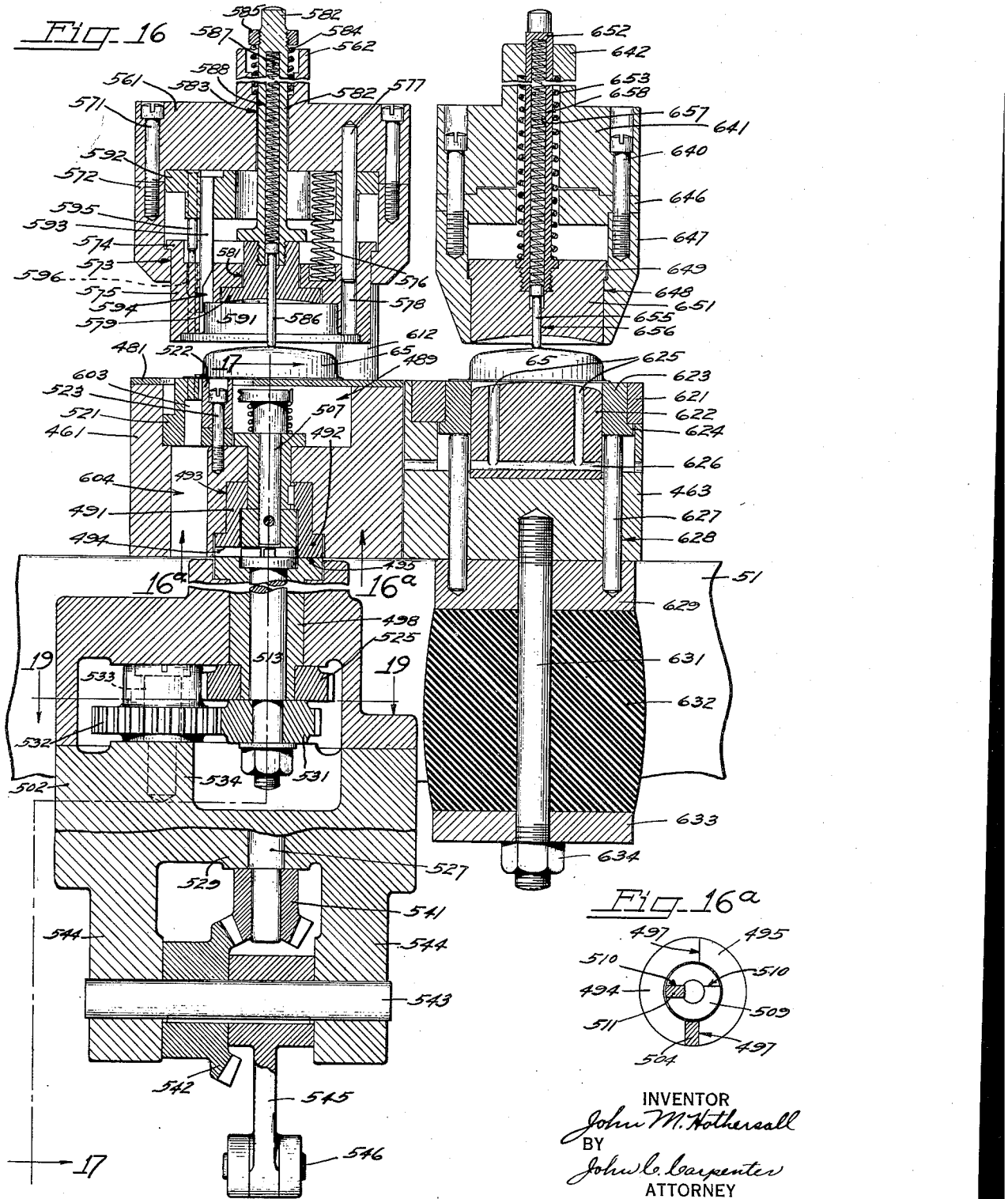

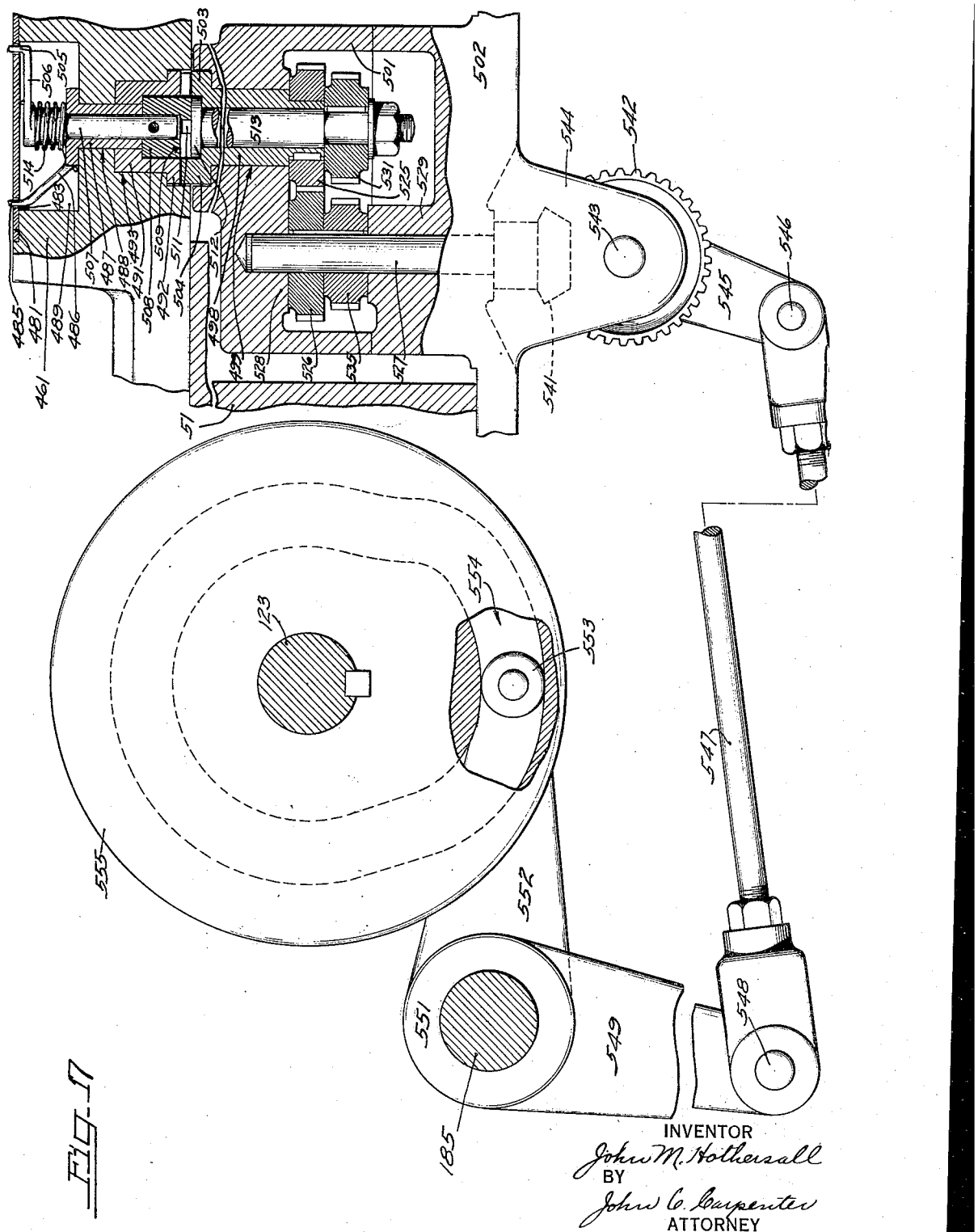

Aug. 9, 1932.  J. M. HOTHERSALL  1,870,728
APPARATUS FOR MAKING LEVER OPENER CONTAINER PARTS
Filed Dec. 30, 1929  22 Sheets-Sheet 12
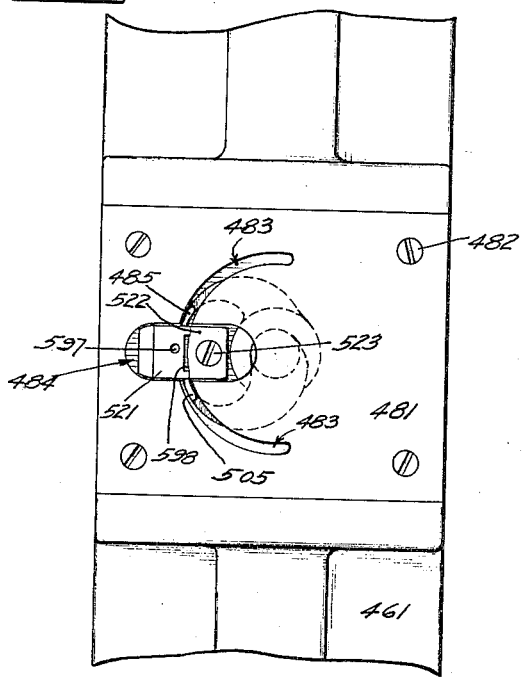
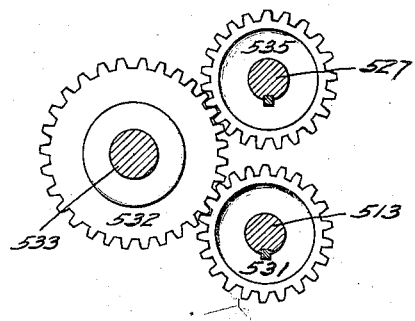
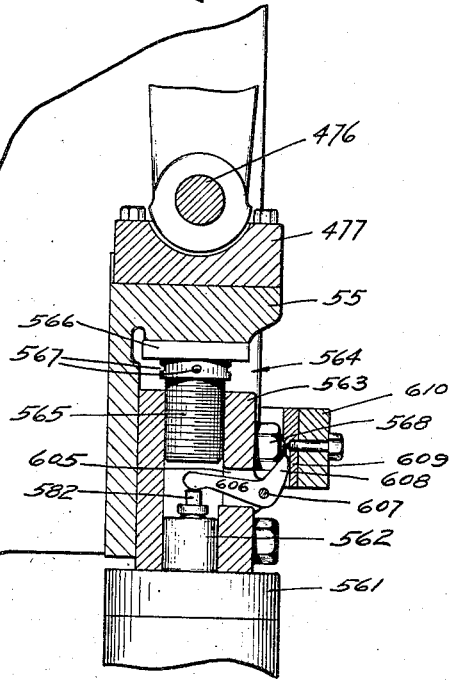
INVENTOR
John M. Hothersall
BY
John C. Carpenter
ATTORNEY

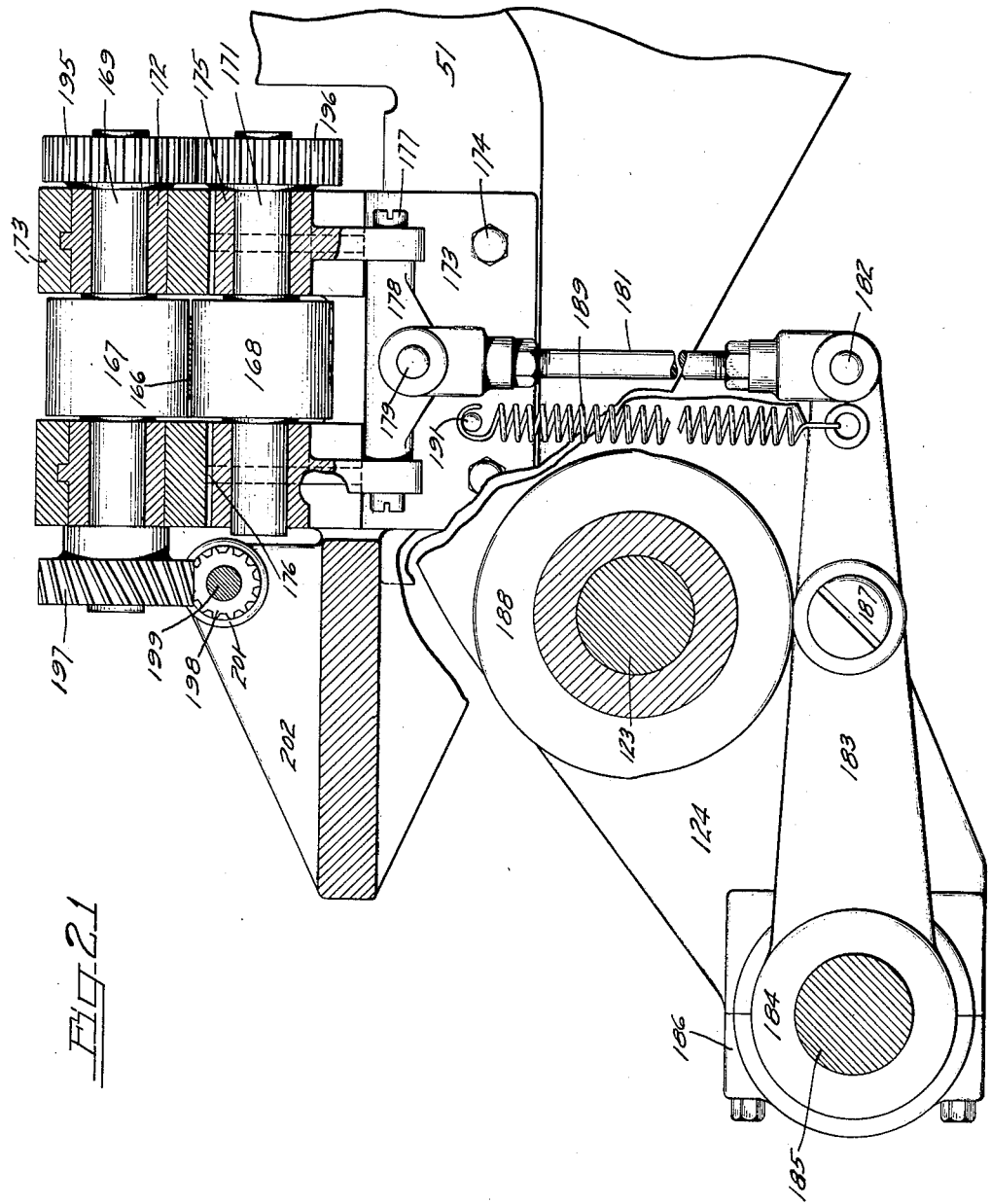

Aug. 9, 1932.   J. M. HOTHERSALL   1,870,728
APPARATUS FOR MAKING LEVER OPENER CONTAINER PARTS
Filed Dec. 30, 1929   22 Sheets-Sheet 14
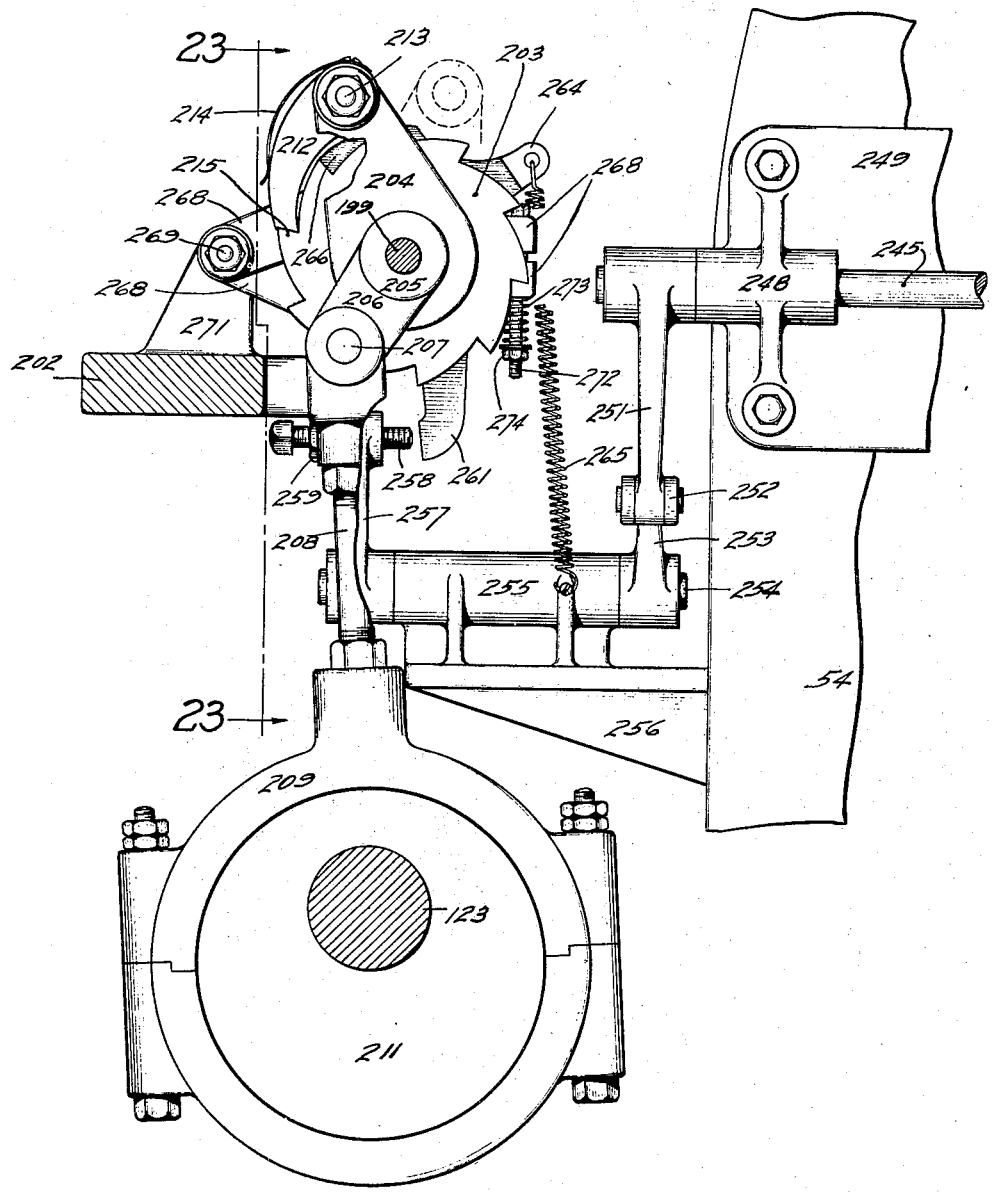
INVENTOR
John M. Hothersall
BY
John C. Carpenter
ATTORNEY Aug. 9, 1932.  J. M. HOTHERSALL  1,870,728
APPARATUS FOR MAKING LEVER OPENER CONTAINER PARTS
Filed Dec. 30, 1929   22 Sheets-Sheet 15

INVENTOR
John M. Hothersall
BY
John C. Carpenter
ATTORNEY

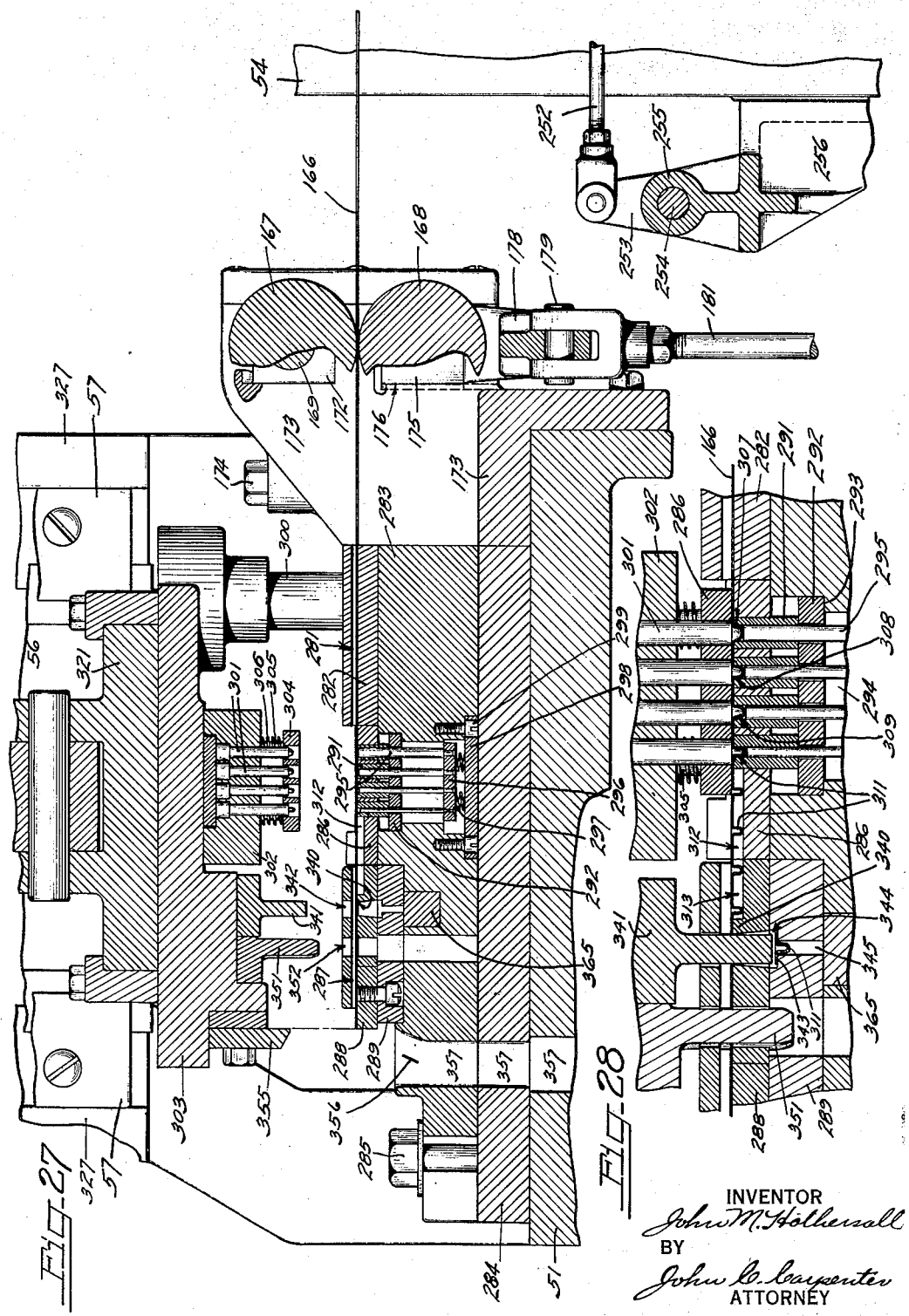

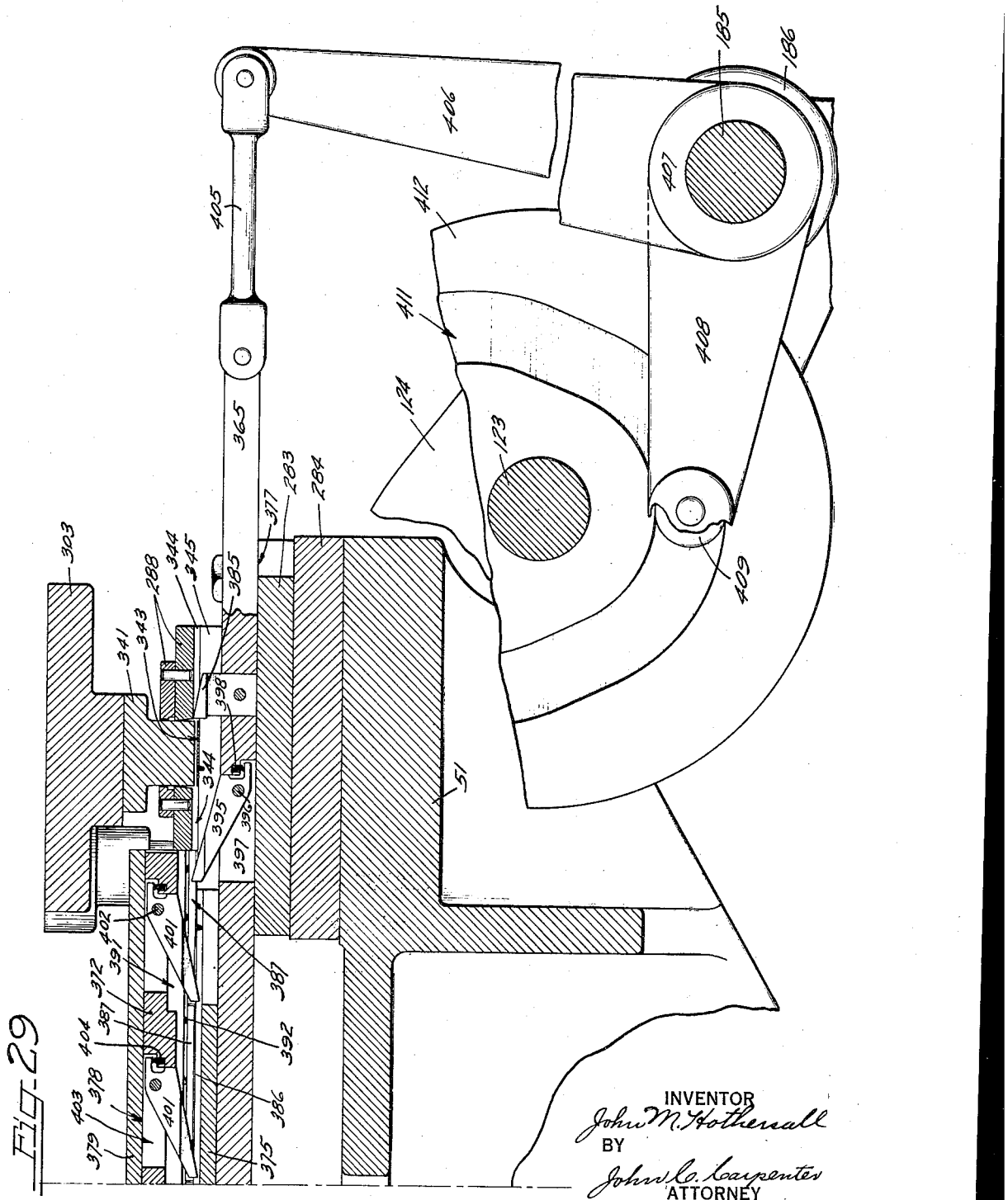

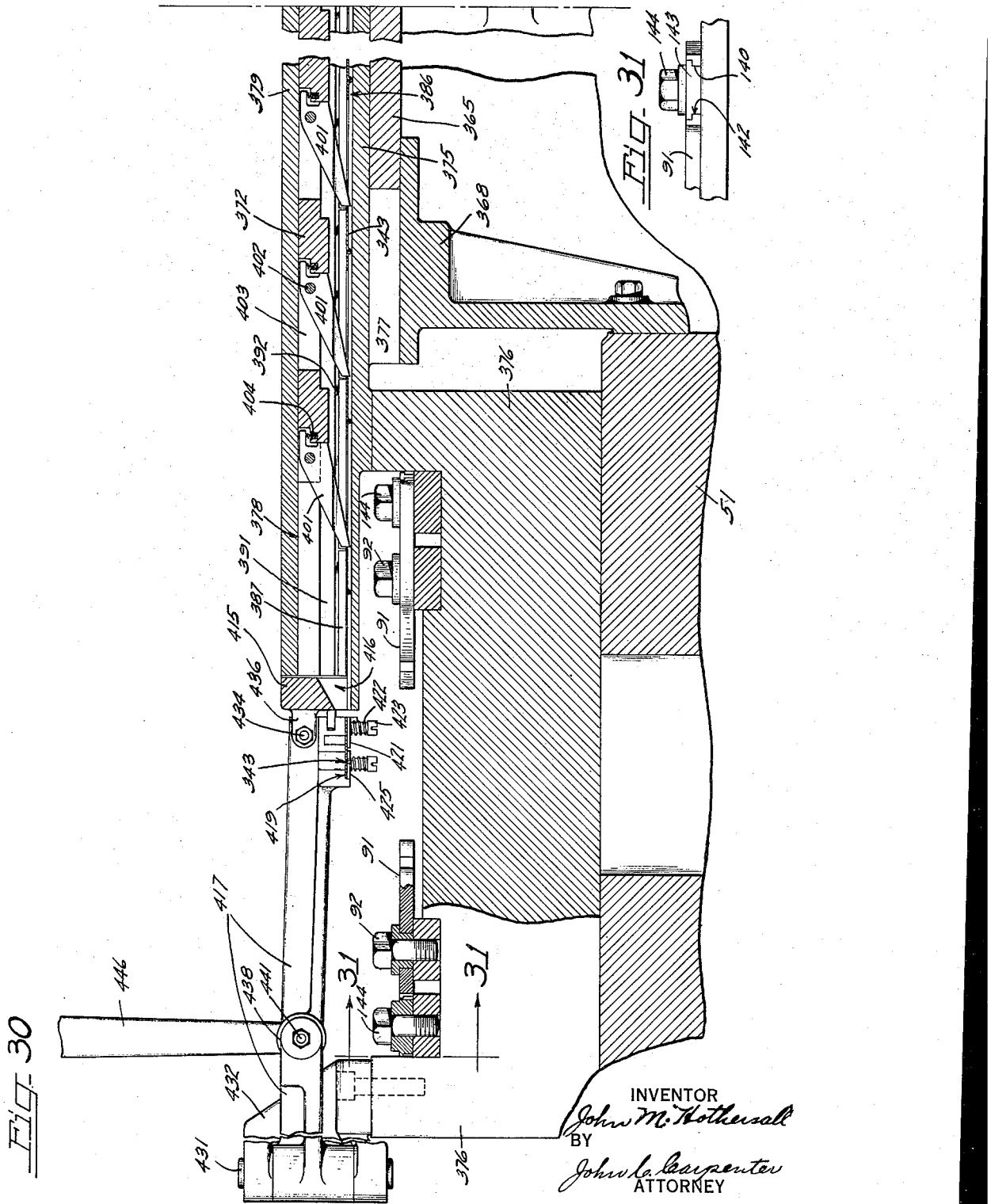

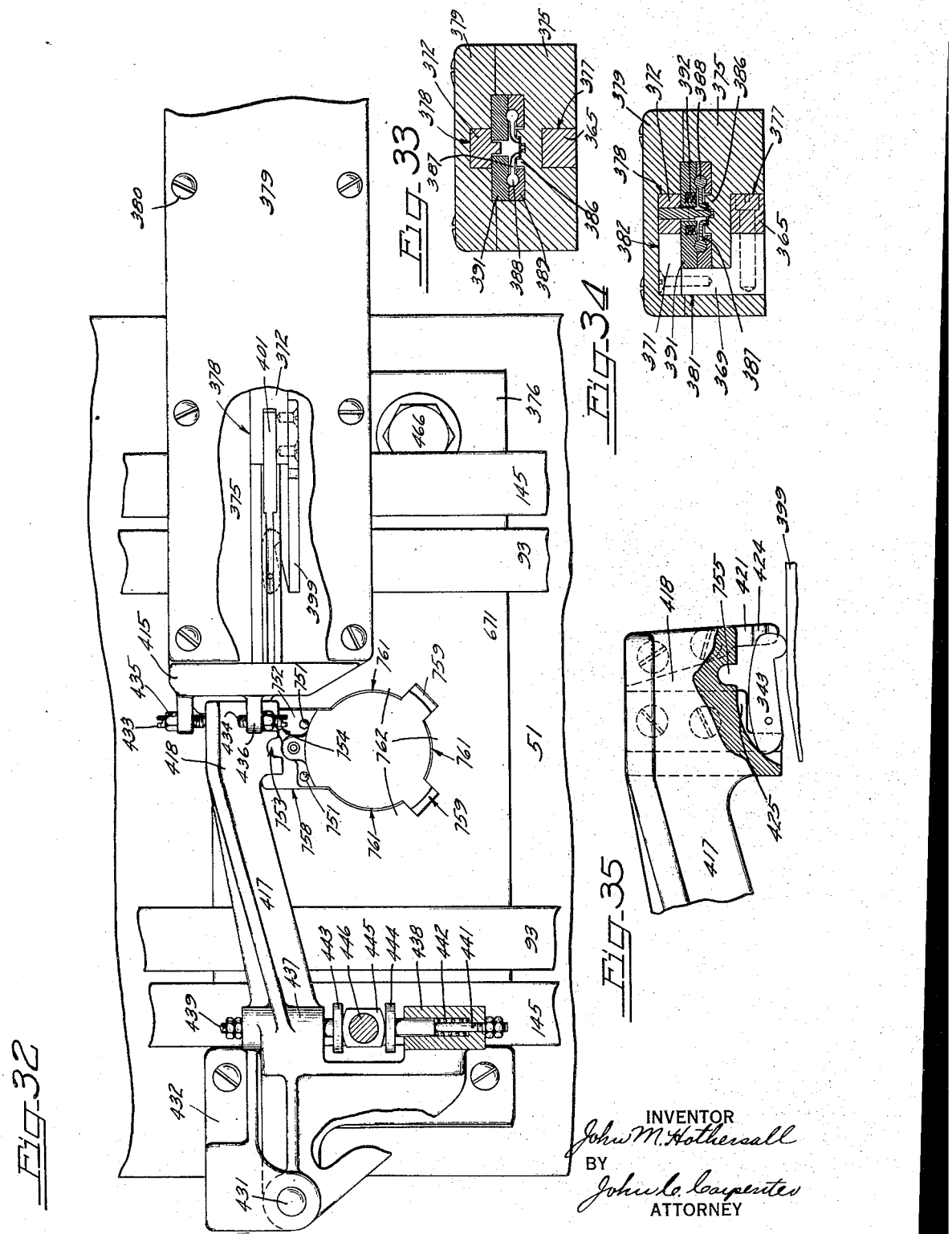

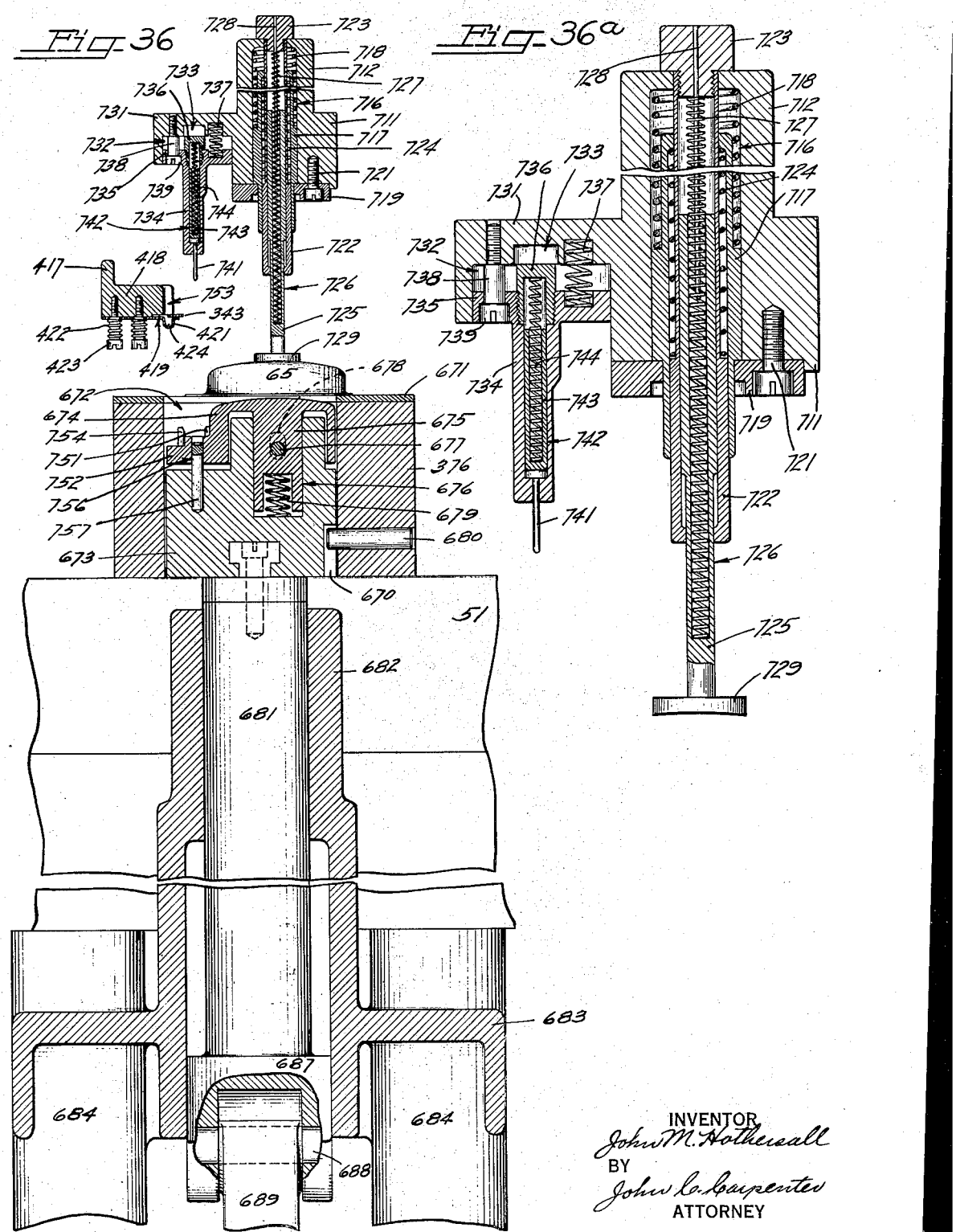

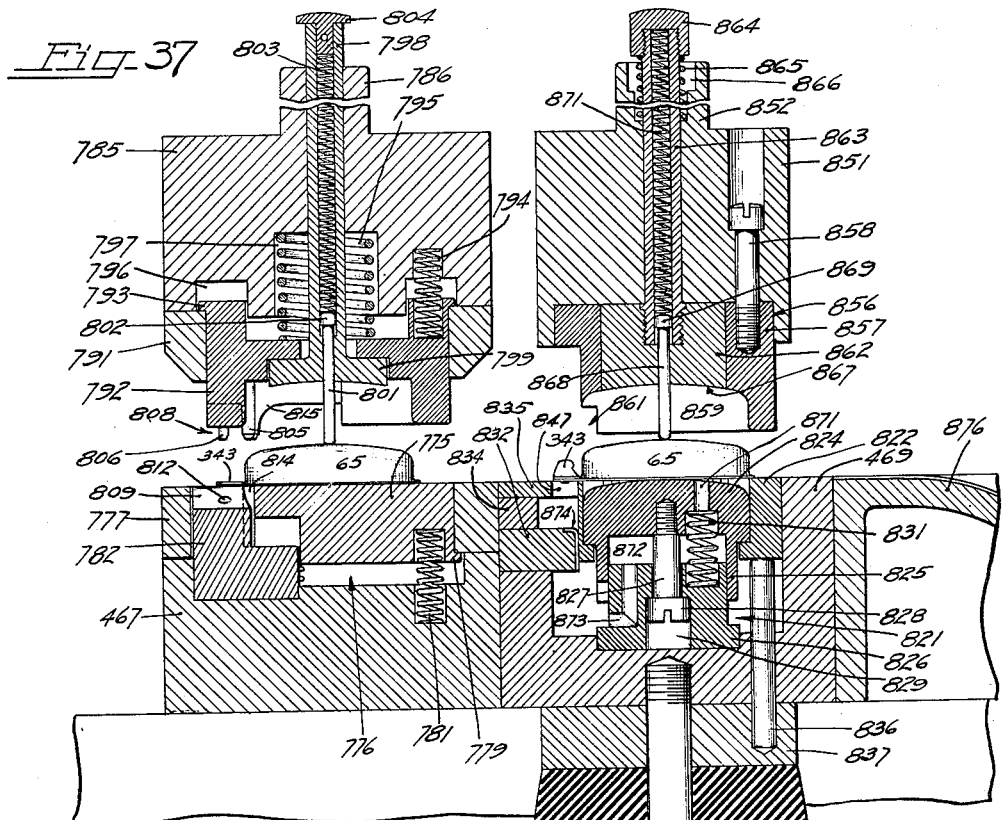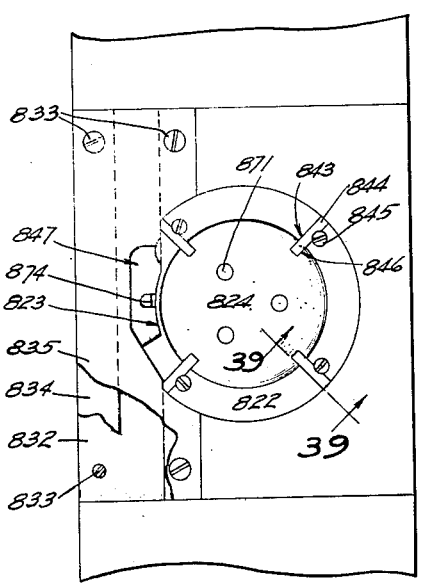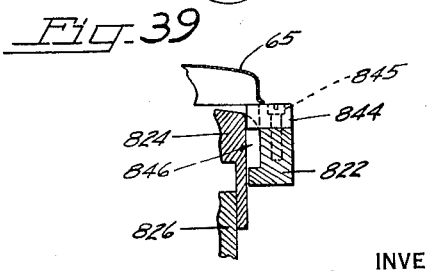

Aug. 9, 1932.  J. M. HOTHERSALL  1,870,728
APPARATUS FOR MAKING LEVER OPENER CONTAINER PARTS
Filed Dec. 30, 1929  22 Sheets-Sheet 22
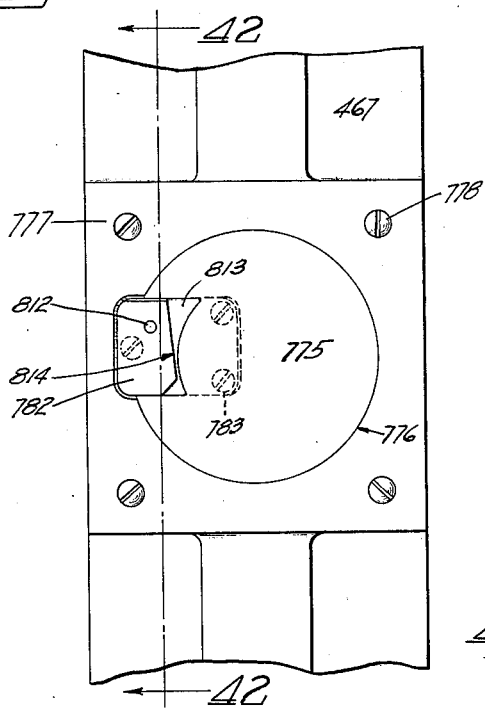
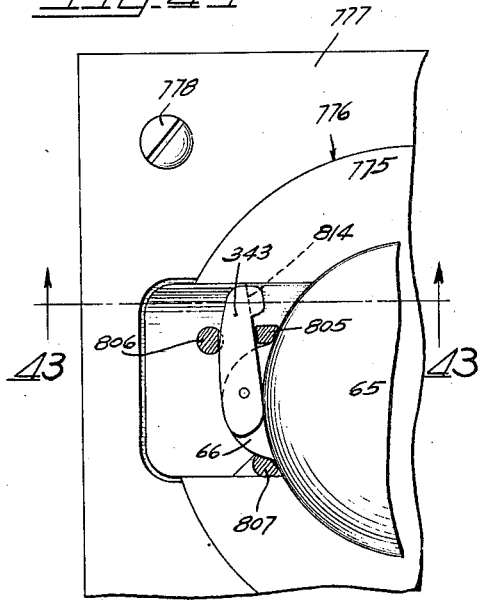
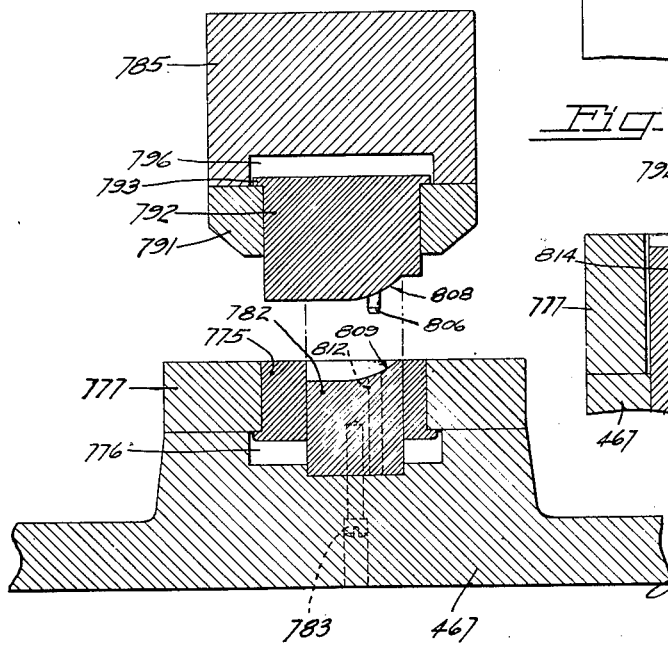
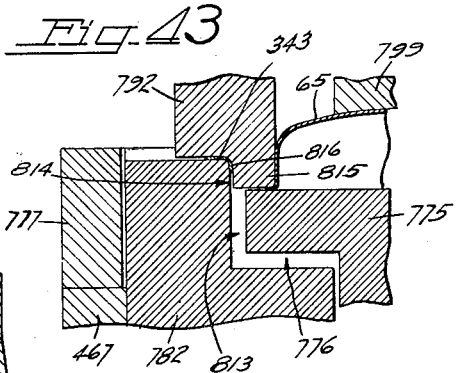
INVENTOR
John M. Hothersall
BY
John C. Carpenter
ATTORNEY Patented Aug. 9, 1932

1,870,728

UNITED STATES PATENT OFFICE

JOHN M. HOTHERSALL, OF BROOKLYN, NEW YORK, ASSIGNOR TO AMERICAN CAN COMPANY, OF NEW YORK, N. Y., A CORPORATION OF NEW JERSEY

APPARATUS FOR MAKING LEVER OPENER CONTAINER PARTS

Application filed December 30, 1929. Serial No. 417,379.

The present invention relates to an apparatus for making opening lever container parts such as container covers provided with individual opening devices used in connection with a mating cover or body to constitute that type of container commonly employed in the packaging of shoe polishes, pastes, salves, etc. The invention has particular reference to the formation of the opening lever, to the preparation of the container part to receive it and to the assembling of the two together.

The invention contemplates mechanism for performing a series of operations on a container part and on a strip of sheet material wherein certain features of shape and size are impressed on and in the container part and wherein an opening lever is formed and cut from the strip, after which the opening lever is automatically secured, preferably with a pivotal connection, to the part which is then discharged from the machine as the finished product.

The principal object of the present invention is the provision of interconnected automatically operating devices for making container parts and opening levers and assembling an opening lever with each container part.

An important object of the invention is the provision of a trip mechanism associated with the feeding devices for advancing a strip of sheet material through a series of operating stations and with other feeding devices for moving a container part through a series of different operating stations, this trip mechanism providing regulation of the feeding of the strip by the presence of a container part.

A further important object of the present invention is the provision of a centering device which functions in cooperation with a feeding mechanism to correctly locate a strip of sheet material successively within a series of opening lever forming dies, the feeding and locating operation utilizing a feeding mechanism for intermittently moving the strip to the centering device and releasing it while such device locates it within the forming dies.

An important object of the invention is the provision of a reciprocating container part feeding device for successively engaging a container part and advancing it in a step by step movement into a predetermined position at each operation station and releasing it after advancement for station operation.

A further important object of the invention is the provision of mechanism for piercing and slotting a container part to adapt it for reception of an opening lever.

An important object of the invention is the provision of cooperating die mechanisms which will slot one wall of a container part and then reshape or redraw it to shift the slot partially within another wall and thereby adapt it to an opening lever.

An important object of the invention is the provision of die mechanisms for projecting a restricted portion of a strip of sheet material into a protuberance and for cutting an opening lever embodying the protuberance from the strip, this form of opening lever being adaptable for pivotal connection with a container part.

A further important object of the invention is the provision of cooperating mechanism which receives an opening lever and a container part and aligns the same while pivotally securing the opening lever to the container part.

An important object of the invention is the provision of assembling mechanism for inserting a protuberance of an opening lever through an opening in a container part and clinching the end of the protuberance against the adjacent container part to provide a movable and pivotal connection between the lever and the container part.

An important object of the present invention is a cutting-off mechanism for the skeleton end of a strip which mechanism cooperates with a strip feeding device which advances the strip through a series of operating stations wherein opening levers are formed and wherein the skeleton strip results as an incident to such opening lever formation.

An important object of the invention is the provision of an opening lever handling device for transporting and holding the lever with exactness and precision, the device employing a transfer arm which receives the lever in an exact position and moves it into alignment with a positioned container part and holds it in aligned position during the application of the same to the container part.

An important object of the invention is the provision of a container part registering device which utilizes fingers adapted to shift a container part from an unregistered to a registered position by automatically engaging a protruding lip on the container part irrespective of the position of the lip when received in the registering device.

A still further important object of the invention is the provision of automatic mechanisms for pivotally uniting an opening lever with a laterally projecting lip on a container part and then bending and shaping the parts to locate the opening lever adjacent the side wall of the container part and in operative position for use as an opening lever.

Numerous other objects and advantages of the invention will be apparent as it is better understood from the following description, which, taken in connection with the accompanying drawings, discloses a preferred embodiment thereof.

Referring to the drawings:—

Figure 1 is a diagrammatic view illustrating a strip of sheet material which has been subjected to various operations in the production of opening levers, this being shown in its relative position to container parts also shown in their different stages of development, the view exemplifying the various operations of the machine.

Figs. 2, 3, 4 and 5 are sectional views showing a container part in different stages of development being taken respectively on lines 2—2, 3—3, 4—4, and 5—5 of Fig. 1.

Figs. 6 and 7 are front elevations of a container part with an applied opening lever illustrating the results of two different operations produced in the machine of the present invention, these figures being taken respectively along lines 6—6 and 7—7 in Fig. 1.

Fig. 8 is a front elevation of the apparatus, parts being broken away.

Fig. 9 is an end elevation of the apparatus, as viewed from the feed-in end of the machine.

Fig. 10 is a rear elevation of the machine.

Figs. 11, 12 and 13 are plan sectional views, which, taken together, illustrate the complete machine as viewed on one horizontal plane, Fig. 12 joining Fig. 11 on the left, Fig. 13 joining Fig. 11 at the top side of its sheet, Figs. 11 and 12 being indicated as being taken substantially along the respective lines 11—11 and 12—12 in Fig. 8 and Fig. 13 being taken substantially along the line 13—13 in Fig. 10.

Fig. 14 is a longitudinal sectional view taken substantially along line 14—14 in Fig. 12.

Fig. 15 is a transverse sectional view taken substantially along the line 15—15 in Fig. 14.

Fig. 16 is a longitudinal sectional view taken substantially along the line 16—16 in Fig. 11.

Fig. 16a is an under-plan detail taken substantially along the line 16a—16a in Fig. 16.

Fig. 17 is a transverse sectional view taken along the line 17—17 in Fig. 16, parts being broken away and parts being illustrated in elevation.

Fig. 18 is a fragmentary plan view of the lower mechanism of the first container part operating station, this being the container lug locating, piercing and slotting station.

Fig. 19 is a sectional plan detail taken along the line 19—19 in Fig. 16.

Fig. 20 is a transverse sectional view taken substantially along the line 20—20 in Fig. 8.

Figure 23:
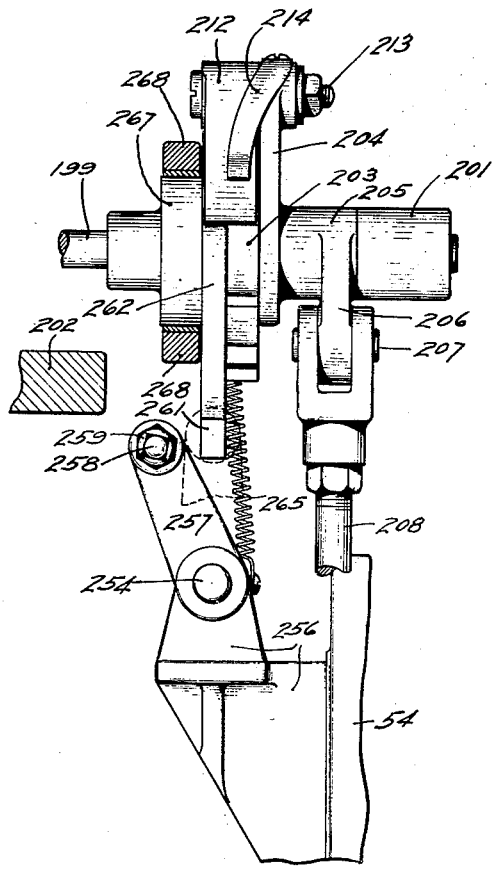
Figure 25:
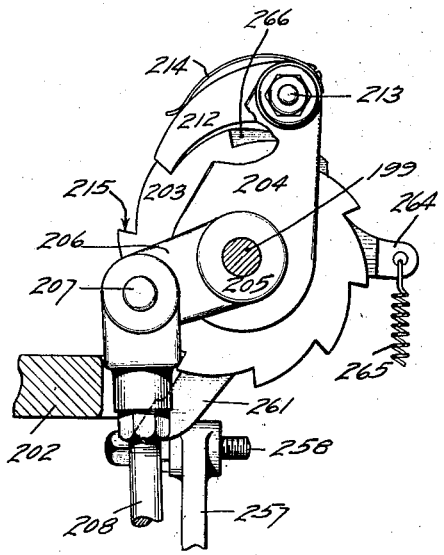
Figure 24:
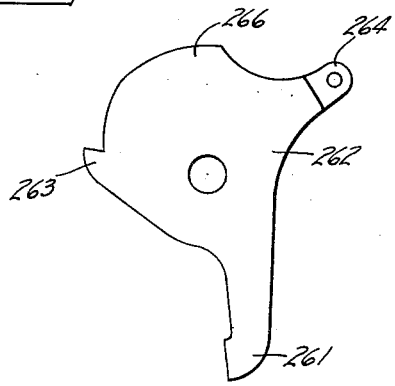
Figure 26:
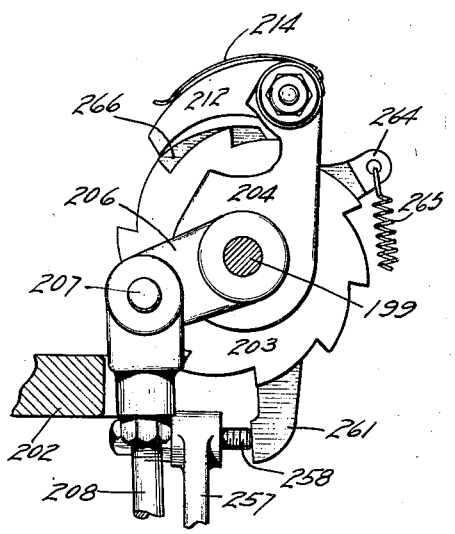

Figs. 21 to 26 inclusive, illustrate either in section or elevation, details of the strip feeding devices, Figs. 21 and 22 being transverse sectional views taken substantially along the respective lines 21—21 and 22—22 in Fig. 13, Fig. 23 being a transverse sectional detail taken along the line 23—23 in Fig. 22, Fig. 24 being a detailed view in elevation of the feed roller pawl and ratchet throw-out device and Figs. 25 and 26 being front elevations of a part of the pawl and ratchet device in different positions.

Fig. 27 is a longitudinal sectional view taken substantially along the line 27—27 in Fig. 13 being a section through the strip and the opening lever forming stations.

Fig. 28 is an enlarged view of the central portion of the mechanism shown in Fig. 27, the movable part of the mechanism at the stations being shown in a different position.

Figs. 29 and 30, taken together, constitute a transverse sectional view of the opening lever transverse feed, Fig. 29 being taken along the line 29—29 in Fig. 13 and Fig. 30 being taken along the line 30—30 in Fig. 11.

Fig. 31 is a fragmentary detail in elevation taken substantially along the line 31—31 in Fig. 30.

Fig. 32 is a plan view of the mechanism illustrated in Fig. 30, parts being broken away and parts being shown in section.

Figs. 33 and 34 are enlarged transverse sectional views of different parts of the lever transverse feed confined passageway, Fig. 33 being taken substantially along the line 33—33 in Fig. 13 and Fig. 34 being taken along the line 34—34 in Fig. 11.

Fig. 35 is a fragmentary detail, partly broken away, of the opening lever transfer arm illustrated in Fig. 32.

Fig. 36 is an enlarged longitudinal sectional view of the die mechanism located at the assembling station, the view being taken along the line 36—36 in Fig. 11.

Fig. 36a is a greatly enlarged view of the mechanism illustrated in the upper part of Fig. 36.

Fig. 37 is an enlarged longitudinal sectional view taken along the line 37—37 in Fig. 11 and showing two of the container part stations, the lever shaping station on the left-hand side and the lug bending station to the right.

Fig. 38 is a fragmentary plan view of the lower part of the lug bending die.

Fig. 39 is a fragmentary sectional view taken along the line 39—39 in Fig. 38.

Figs. 40, 41, 42 and 43 illustrate lever shaping station mechanism, Fig. 40 being a fragmentary plan view of the lower part of the mechanism, Fig. 41 being an enlarged plan view of the same with parts removed, Fig. 42 being a transverse sectional view taken along the line 42—42 in Fig. 40 and Fig. 43 being a sectional view taken along the line 43—43 in Fig. 41.

The apparatus shown in the drawings and which embodies the present invention comprises a table on which is located a series of operating stations.

Partially formed container parts, which in the preferred embodiment herein illustrated, comprise drawn shell slip covers for containers of the class described, may be introduced in any suitable manner into the upper end of a circular chute which constitutes the receiving part of the apparatus. These parts move downwardly through the circular chute being so advanced by a segmental rack carrying a series of pivoted feed dogs. The rack moves continuously up and down, the feed dogs on the downward stroke engaging behind and above the container parts carrying them along with the moving rack, while on the upward or return stroke the dogs move on their pivots and idly pass over the container parts. During such a return movement, each container part is held in its advanced position by spring pressed members projecting into the chute from the side walls thereof.

The lower or discharge end of the circular chute communicates with the upper surface of certain die parts positioned at some of the operating stations, these die parts being clamped to and supported by the table. The container part delivered to this surface from the chutes is grasped on opposite sides by feeding fingers pivotally mounted on sliding bars which advance it step by step through the stations.

Simultaneously with the advance of a container part through the machine, a strip of sheet material is moved over the feed table in the same direction of travel, this strip advance being along a line parallel to and spaced from the line of travel of the container parts. The strip is advanced in a step by step or intermittent motion by means of feed rollers connecting with an actuating member through a pawl and ratchet device. Following each intermittent movement, certain operations are performed upon the strip as it passes through a series of operating stations and opening levers are thus produced.

A trip device is interposed between the circular chute for the container parts and the feeding rollers for advancing the strip material, this being in the nature of a clutch device which moves the pawl from its ratchet and prevents rotation of the feed rollers when there is a failure in the feeding of container parts within the chute. Following each advance movement of the segmental rack, a detecting member is introduced into the circular feed chute and if this member engages a container part in proper position, the clutch device permits pawl and ratchet engagement for the feeding rollers and an advance movement is given to the strip.

The operation of die parts at the stations along the line of travel of the strip produces a partially formed opening lever preferably having a protuberance. The skeleton or that part remaining of the strip after removal of the opening levers advances into and through a station where a pilot pin enters one of the openings left in the skeleton strip and aligns or centers the strip by reference to this space. This centering of the strip prior to each operating cycle insures proper formation of the opening levers by correctly centering the strip into each forming mechanism the feeding rollers at this centering operation being automatically separated to free the strip at that point.

Following this centering operation the end of the advancing skeleton strip passes into a cut-off mechanism which snips off its end and discharges the scrap piece out of the machine. Since a given length is thus cut off at each operating cycle there is no accumulation of scrap.

As the partially formed lever is removed from the strip, it is brought into a transfer feeding mechanism of the reciprocating feed bar type which advances it in a step by step movement through a confined passageway provided with resilient holding members. This transfer mechanism moves the opening lever into holding fingers of a transfer arm which receives the lever in an exact position and moves it to an exact position in an assembling station on the feed table to which a container part has been brought.

This container part during the formation of the opening lever just described has been passing through some of the stations located along its line of travel and a series of operations has taken place on it preparing it to receive the opening lever. Briefly these operations will now be described.

The container part when brought to rest at the first operating station is centered for a piercing and slotting operation. This container part which is preferably provided with a laterally extending lip may be in any one of a number of positions when so received. The centering mechanism which comprises opposed operating fingers, engages the lip of the container part and shifts it into a predetermined position.

After centering, the lip is engaged by mechanism carried on a vertically operating head which cooperates with fixed die members carried by the table and the lip is perforated and slotted.

A container part with its perforated lip on its next advance movement is brought into the second operating station where it is redrawn or reshaped to move the slot partially within the side wall of the container part.

The perforated, slotted and reformed container part is next brought to rest at the assembling station where it is held with its lip in a predetermined position and the opening lever is here brought by the transfer arm into a position where its protuberance is in axial alignment with the perforation of the lip. The parts are then assembled so that the protuberance of the opening lever extends within the perforation of the lip of the container part. The lower or outer end of the protuberance of the opening lever is then upset or riveted under the lip of a container part providing a pivotal connection.

At the next station, the container part with its opening lever is centered in a lever reshaping mechanism comprising a fixed lower die located in the table and a cooperating die member carried by the slide head which bends the end of the opening lever to provide a finger lug and at the same time a circular shape is imparted to the lever corresponding to the circular side wall of the container part.

The container part, with its opening lever, is then brought into the final operating station where fixed die members located in the table cooperate with movable die parts carried on the sliding head to bend the container part lip at right angles and position the now circular opening lever adjacent the side wall of the container part. When in this position one end of the opening lever is in alignment with the slot previously cut in the container part and is thus in an operable position for opening after it has been assembled with a container body.

The next advance movement of the feeding device carries the now fully formed container part with attached opening lever to the end of the table where it is projected into an inclined discharge chute.

Referring in detail to the drawings and particularly to Figs. 8, 9 and 10, the fixed die elements of the various operating stations are mounted upon a table 51 carried by supporting legs 52. Some of the movable parts of the apparatus are carried on an arch frame 53 formed integrally with supporting side frames 54 which in turn are carried by the table 51.

The movable die parts associated with the various stations along the path of travel of the container part are carried in a sliding head 55 vertically movable in guideways formed in the side frames 54 and located towards the front of the machine. In a similar manner, the movable die parts for operation on the strip are carried by a slide head 56 moving vertically in guideways formed in an auxiliary frame 57 positioned in the rear of the machine and connected with the side frames 54 by a transverse frame 58.

At one end of the machine, this being the entrance or feed-in end, a feed table 61 is secured to and carried by the table 51 and it is here that the container parts are received. An entrance chute 62 (Fig. 14) is connected with a circular support plate 63 which constitutes the floor of a circular chute 64, the plate being secured to and supported upon the feed table 61. A container part 65 having a lateral flange or projecting lip 66 and a drawn circular side wall 67 (Figs. 2 and 14) is brought into the entrance chute 62 in any suitable manner from whence it passes by gravity into the circular chute 64.

Supporting plate 63 is formed with integral projecting walls 68 (Fig. 15) which are spaced from each other a sufficient distance to permit passage of the container part 65 therealong. A cover plate 69 is bolted to and carried upon each of the walls 68, the inner ends thereof being spaced from each other to provide a slot 71 which communicates with the chute 64.

A segmental rack 72 (Figs. 14 and 15) is adapted to move up and down within guideways 73 formed in the plates 69 adjacent the slot 71 and is held against displacement by retaining bars 74 bolted on each plate 69. The rack 72 is slotted longitudinally as at 75 and a series of feed dogs 76 are pivoted at 77 to the rack, the forward end of each dog 76 projecting through the slot 71 and engaging behind a container part 65 when in proper position. Upon the upward movement of the rack 72 the dogs 76 move about their pivots and pass over the container parts 65 located in the chute 64, but when the rack 72 moves downwardly, each feed dog 76 engages behind a container part 65 and moves it along the circular chute 64.

Each container part 65, as it passes along its chute 64 moves between oppositely spaced buttons 78, having a slight sliding action in lateral openings formed in the side walls 68 and these buttons normally project within the chute 64 being so held by coil springs 79. During the rest period of the container part 65 and while the rack 72 moves upwardly, the buttons 78 under the influence of their respective springs 79 engage on opposite sides in front of and behind the container part and hold it in position while the feed dogs 76 pass thereover.

The rack 72 is provided with a gear tooth section 81 (Figs. 8 and 14) which is engaged by a segmental gear 82 secured to a rockshaft 83 journaled in a bracket 84 projected from one of the side frames 54. Shaft 83 also carries an arm 85 (Figs. 8 and 9) which is connected with a moving part of the feeding device for advancing the container parts through the various operating stations and which will now be described.

This feeding device comprises a plurality of pairs of feeding fingers 91 (Fig. 11) pivoted on vertical studs 92 carried by two parallel bars 93 spaced on opposite sides of the line of travel of the container part through its operating stations. The rear end of the spaced bars 93 (Figs. 12 and 14) are connected by a crosshead 94 which is secured at its center by a bolt 95 to the forward end of a slide member embodying spaced rearwardly extending projections 96. Each projection 96 (see also Fig. 9) is slotted along its outer edge as at 97 and is engaged by a feather 98 bolted at 99 within a slot 101 formed in the feed table 61. This construction provides a support for the rear end of the bars 93 and permits longitudinal sliding movement on the feed table 61.

The forward end of each bar 93 (Fig. 11) carries a projecting rib 102 on its inner face and this rib slides within a slotted plate 103 connected by screws 104 to a support block 105 bolted to the table 51. Each bar 93 is thus supported at its rear and forward ends, the two bars being held in spaced position to each other and within their respective slideways.

The bars 93 are moved back and forth by a cam controlled device clearly illustrated in Fig. 14. The bolt 95 of the crosshead 94 carries a cam roller 108 which operates within a cam groove 109 formed on the outer periphery of a barrel cam 111 rotatably supported on ball bearings 112 mounted upon a horizontal shaft 113 held in stationary position, within bearings 115 and 116 formed in the table 61, by keys 114.

The cam 111 is rotated about its shaft 113 by a chain and sprocket drive mechanism. Cam 111 at its forward face carries a sprocket 118 secured thereto by bolts 119 and this sprocket 118 is engaged by a link chain 121 which also passes over a sprocket 122 (Figs. 8, 9 and 10) secured to a horizontal cam shaft 123 journaled in bearings 124 carried by the table 51. The chain 121 also passes over a sprocket 125 rotating with and secured to a horizontal crankshaft 126 journaled in bearings 127 formed in the side frames 54 and in bearings 120 projecting from the arch frame 53, the chain thence passing over an idler sprocket 128 rotating on a stud 129 carried by a bracket 131 projected from one side of the table 61.

The crankshaft 126 carries a gear 132 which meshes with a pinion 133 carried by a drive shaft 134 journaled in bearings 135 carried by the side frames 54 adjacent the arch frame 53. This drive shaft 134 receives rotation from any suitable outside source as for example, by application of belt power through a drive pulley 136 carried thereon.

Continuous rotation of the drive shaft 134 through the described connections with the barrel cam 111 causes the latter to rotate and move its cam groove 109 along the roller 108 thus effecting forward and backward movement of the feed bars 93. As will be evident from the following description, the forward bars are accompanied by an advance movement of the container parts while the return movement of the bars is utilized to shift the feeding fingers carried thereby backward to a succeeding container part.

The fingers 91 (Fig. 11) are arranged in pairs, one of each pair being pivoted on one bar 93 directly opposite its mate which is mounted on a similar pivot on the other spaced bar. This provides a pair of feeding fingers 91 which are adapted to move into engagement with each container part 65 passing through the machine at this place. For more effective container part engagement each finger 91 is provided with a jaw 141 formed to fit snugly the side wall 67 of the container part 65. Each pair of fingers 91 is moved into engagement with a container part to effect feeding of the same, this movement of the fingers being in proper synchronism with the various operations of the mechanism arranged along the path of travel of the container part.

Each finger 91 (Figs. 11 and 31) is provided with a slot 142 in which operates a block 143 pivoted on a bolt 144 carried by a bar 145 positioned adjacent and outside of the bar 93. A tongue and groove connection 140 is provided in the side walls of the slot 142 and the side walls of the block 143 and this permits a smooth sliding action between the parts and at the same time prevents displacement or misalignment. There are two bars 145, these being on the outside of the bars 93 and the former are adapted to be moved back and forth to control opening and closing of the fingers 91 on the container part 65.

Each bar 145, at its forward end, is formed with a projecting rib 146 extended outwardly therefrom and engaging a slotted plate 147 thus forming a sliding connection, the plate being secured by screws 148 to the block 105. The forward ends of the associated bars 93 and 145 are connected by links 149 which insures proper holding of the respective projections 102 and 146 within their slideways while allowing sliding movement thereof.

The rear end of each bar 145 (Figs. 12 and 14) is pivotally connected with a crosshead 151 having a rearwardly extending tail block 153 slotted at 154 (as shown in Fig. 9) for engagement with projections 155 (also shown in Fig. 12) formed on the inner side walls of the projections 96 of the crosshead 94. A bolt 152 seated in the crosshead 151 (Fig. 14) carries a cam roller 156 operating within a cam groove 157 formed in the barrel cam 111 adjacent the groove 109. Rotation of the cam 111 thus causes a forward and backward movement of the bars 145.

The cam grooves 109 and 157 are parallel throughout a part of their extent and diverge at other places. This provides for a relative movement between the bars 93 and 145 throughout a part of their forward cycle of movement and effects a pivoting of the fingers 91 to bring their jaws 141 into container part engagement, after which, throughout their remaining forward cycle of movement, the bars move together to advance the container part into a succeeding station.

During the operation of the mechanism at any particular station, a relative movement of the bars 93 and 145 takes place as the rearward cycle of movement begins and this causes the separation of jaws 141 of the fingers 91 to release the container part while the fingers return to their initial starting point for the next feeding operation on a succeeding container part.

The crosshead 94 has bolted to one side thereof, a bracket 161 (Fig. 12) pivotally connected at 162 to a tie rod 163 pivoted at 164 to the arm 85 (see also Fig. 8). It is by reason of this connection that the shaft 83 and its rack pinion 82 are oscillated for the feeding of the container parts 65 along the circular chute 64 as previously described. The close connection between the feeding devices comprising the feeding fingers 91 and those of the auxiliary chute feed comprising the feed dogs 76 insure the correct passage of a container part 65 from one feeding device to the other without any irregularity of movement in its travel.

Figure 1:
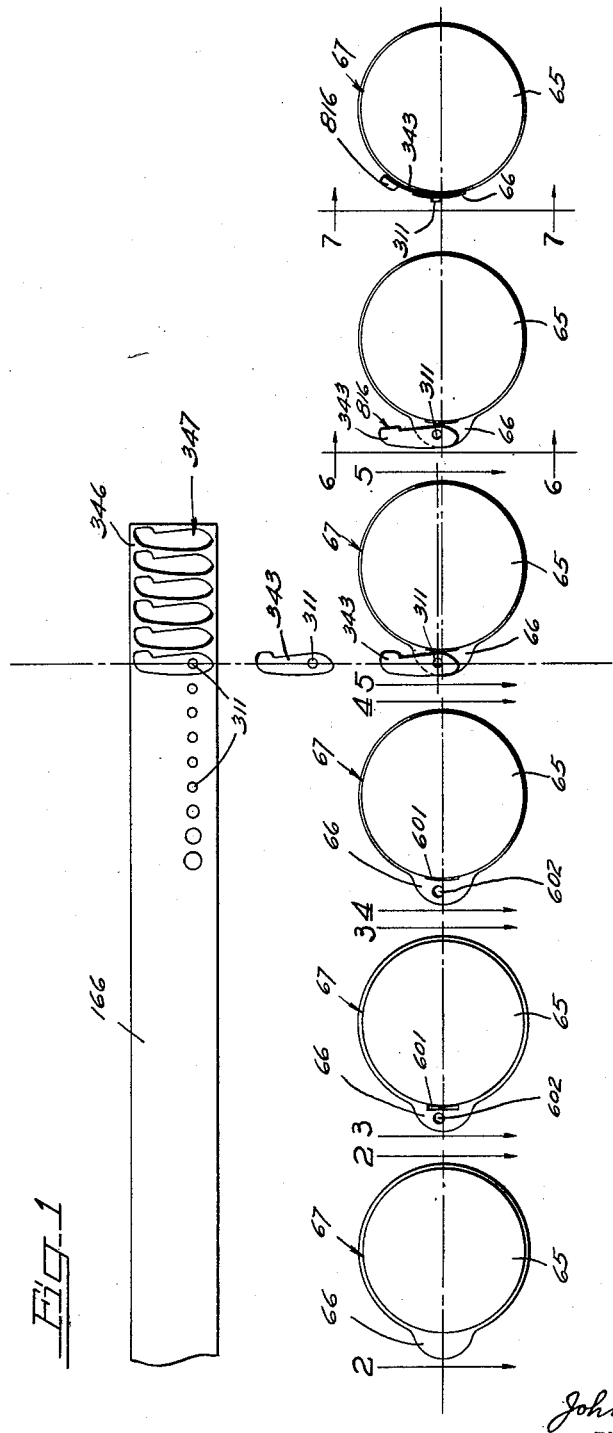

There are five operating stations arranged in a straight line to which the container part 65 is conveyed by the feeding fingers 91. In Fig. 1 there are shown six container parts 65 in different stages of formation. The first or left-hand container part 65 is positioned at an idle station located at the exit end of the circular chute 64 and it is at this position where the container part is first engaged and moved by the feeding fingers. The five remaining container parts illustrated in Fig. 1, to the right of that shown at the first or idle station, diagrammatically indicate the results of the various operations at the succeeding five operating stations. In a similar manner, there is disclosed in Fig. 11, a container part 65 (on the left end of the view) at its initial idle station and five other container parts in the succeeding five operating positions immediately to the right.

Figure 2:
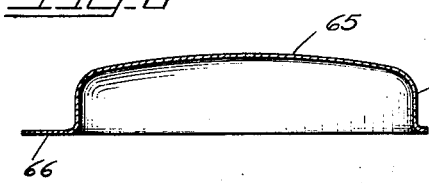
Figure 3:
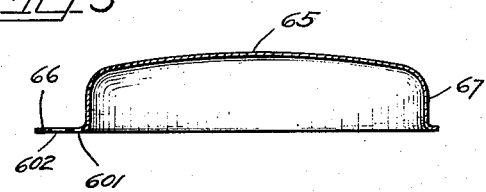
Figure 4:
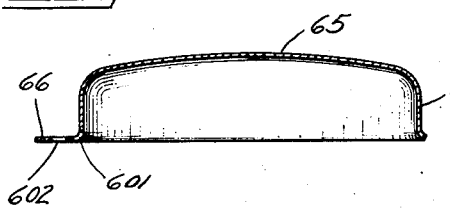
Figure 7:
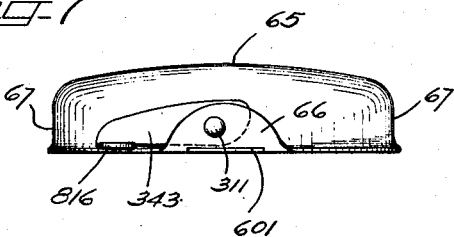

Figs. 2 to 7 incl. illustrate in detail a container part after it has been successively subjected to the various operations. Fig. 2 illustrates the container part 65 as it appears when first brought into the idle station and Fig. 7 illustrates the same after all operations appertaining to the present apparatus have been completed.

Details of the mechanism of the various stations and a full description of their operation will be set forth in the following pages but first there will be given a description of various operations taking place in a different part of the machine. This alludes to the feeding of a strip 166 of sheet material in an intermittent or step by step movement and to a series of operations taking place on the strip during the intervening rest periods whereby an opening lever is prepared and brought to one of the container part stations.

The strip 166 is fed forward between an upper feed roll 167 (Figs. 13, 21 and 27) and a lower feed roll 168 mounted respectively on shafts 169 and 171, the former rotating in bearings 172 carried in a bracket 173 secured by bolts 174 to the table 51. Bracket 173 is mounted on the rear of the table 51 and this positions the strip 166 parallel to, but spaced from, the feed bars 93.

While the fixed bearings 172 hold the shaft 169 against vertical or horizontal movement, the shaft 171 is journaled in bearing blocks 175 having vertical movement within slotted guideways 176 formed in the bracket 173. Each block 175 is connected at 177 with a crosshead 178 carrying a pivot pin 179 which is engaged by a tie rod 181 pivotally connected at its lower end as at 182 to the outer end on an arm 183 formed integrally of a sleeve 184 (see also Figs. 9 and 10) carried on a horizontal stationary shaft 185 secured in bearings 186 carried in the brackets 124.

The arm 183 carries a cam roller 187 which engages a cam 188 secured to the cam shaft 123, the roller being held in engagement with its cam by a spring 189 connected with the arm 183 at its lower end and at its upper end with a stationary pin 191 located in the bracket 173. Under the action of the spring 189, the roller 168 presses against the strip 166 and holds it against the roller 167 as long as the reduced part of the cam 188 permits. During a part of its rotation, however, that is when its enlarged section contacts the roller 187, the arm 183 is depressed and roller 168 is lowered permitting disengagement between the strip 166 and the upper roller 167. This disengagement takes place during each cycle of operation of the various mechanisms at the operating stations arranged along the line of travel of the strip 166 and permits accurate centering of the strip prior to each operation, as will be more fully explained hereinafter.

Rollers 167 and 168 (Fig. 21) are adapted to move at uniform peripheral speeds, mating gears 195 and 196 being mounted respectively upon the shafts 169 and 171. The amount of separation resulting from the periodic lowering of roller 168 just described is not sufficient to disengage the teeth of the gears 196 and 195.

The shaft 169 is extended at one end and carries a spiral gear 197 (Figs. 10, 13 and 21) which meshes with a pinion 198 secured to a horizontal shaft 199 journaled in bearings 201 formed in a bracket 202 carried by the table 51. The shaft 199 is associated with a pawl and ratchet device which forms a connection at certain times between the shaft 199 and an actuating member operating through the cam shaft 123.

A ratchet wheel 203 (Figs. 22, 23, 25 and 26) is secured to the shaft 199 and an arm 204 formed integrally with a sleeve 205 is loosely mounted on the shaft adjacent the ratchet wheel. The sleeve 205 is also formed integrally with an arm 206 pivotally connected at 207 with an adjustable rod 208 threadedly secured to an eccentric strap 209 positioned on an eccentric 211 secured to the cam shaft 123. Rotation of the cam shart 123, through the eccentric and connections, oscillates the sleeve 205 and its arms 204 on the shaft 199 which moves idly over the shaft unless there is formed a connection with the ratchet wheel 203.

To provide for such a connection, the arm 204 carries a pawl 212 mounted on a pivot pin 213. A leaf spring 214 carried by the arm 204 projects on the outside of the pawl 212 constantly urging its free end toward the ratchet wheel 203. Under the normal operation of the machine, the pawl 212 is permitted to engage one of the teeth 215 of the ratchet wheel 203 and during such engagement oscillation of the sleeve 205 and arm 204 oscillates the shaft 199 in unison therewith.

Engagement of the pawl and ratchet can take place to effect partial rotation of the shaft in one direction only and upon the return movement of the arm 204, the spring 214 permits pivoting of the pawl 212 about its pin 213 and its free end passes over the teeth of the wheel without effecting movement thereof in the usual manner. The partial rotation of the shaft 199 is in synchronism with the closing of the feeding rollers 167 and 168 in their feeding positions on the strip 166 and the latter is thus advanced a definite distance at this time.

In the event that a container part 65 is not fed in proper position within the feed chute 64, it is desirable that feeding of the strip 166 be interrupted until such time as a container part is in proper position. For this purpose a connection is made between the feed chute and the strip advancing mechanism whereby the strip is advanced only when a container part 65 is properly passing through the chute. By means of this interconnection, one opening lever is prepared for each container part passing through the machine and no excess of either lever or container part is possible.

Following each advance movement of the segmental rack 72, a detecting finger block 221 (Figs. 9 and 14) carried on an arm 222 is moved toward the chute 64 through a slot 223 formed in the plate 63 and if no container part 65 is in the chute in line with the block, it makes a full movement into the chute 64. If a container part 65 is in such a position the block 221 is prevented thereby from moving into the chute and certain actions then take place which relate back to the feeding of the strip 166.

The arm 222 is carried on a rockshaft 224 (see also Figs. 8 and 10) which is journaled in a bearing 225 formed in the plate 63. The shaft 224 also carries a lever 226, the upper end of which is connected by a rod 227 to an arm 228 of a lever 229 mounted on a stub shaft 231 carried by a bracket 232 projected from one of the side frames 54. A second arm 233 of the lever 229 carries a cam roller 234 operating in a cam groove 235 formed in a cam 236 carried by the crankshaft 126. The cam groove 235 is widened throughout a portion of its extent for a purpose which will soon be apparent.

Lever arm 228 (Figs. 10 and 14) is connected with the chute frame 62 by a spring 237 which tends to hold the arm 233 of the lever 229 against the left-hand wall (looking at the back of the machine as viewed in Fig. 10) of the cam groove 235. Rotation of the cam 236 forces the cam roller 234 into the narrow part of the cam groove 235 rocking levers 229 and 226 and the shaft 224 to move the block 221 out of the slot 223 and away from the interior of the chute 64.

After the narrow part of the cam has passed by the roller 234 and the spring 237 still tending to hold the roller against the left-hand side of the cam groove, the incline surface of the groove moves the upper end of the arm 233 until the roller comes opposite the wide part of the cam groove 235. The levers 229 and 226 during this action move in the opposite direction and the block 221 under the action of the spring 237 is permitted to move toward the slot 223. If a container part 65 is in proper position, it is engaged by the block 221 and this action arrests further movement thereof and the roller 234 of the lever 229 then remains toward the right-hand wall of the cam groove 235 and no further action takes place.

The lever 226 is connected at its lower end 241 (Figs. 9, 10 and 14) to rod 242 which is pivoted at its opposite end 243 to an arm 244 secured to one extremity of a horizontal rockshaft 245 (see also Fig. 22) journaled in a bearing 246 carried by a bracket 247 bolted to one of the side frames 54, and in a bearing 248 carried by a bracket 249 bolted to the same side frame 54. The rockshaft 245 also carries an arm 251 which is pivoted to a connecting rod 252 which is pivoted at its opposite end to an arm 253 secured to a rockshaft 254 journaled in a bearing 255 formed in a bracket 256 projected from the frame 54. Rockshaft 254 also carries an arm 257 in the free end of which is threadedly secured a bolt 258 held in adjusted position by a locknut 259.

In the event that the block 221 does not meet resistance when it passes through the slot 223 and into the chute 64, the arm 257 is moved into a position wherein its bolt 258 is in the path of travel of a projecting finger 261 (Fig. 22 to Fig. 26 incl.) which is part of a pawl control member 262 loosely mounted on the shaft 199. This member 262 is positioned adjacent the ratchet wheel 203 and is provided with a single tooth 263.

The member 262 is also provided with a projecting eye 264 which is connected, by a spring 265, to the bracket 256. The spring 265 tends to rotate the member 262 on the shaft 199 in a clockwise direction as viewed in Figs. 22, 25 and 26, and to engage its tooth 263 with the end of the pawl 212, as illustrated in Fig. 25. Starting with these parts in their engaged position, an oscillation of the arm 204 in a counter-clockwise direction under the action of the eccentric 211 causes a corresponding movement of the ratchet wheel 203 and the shaft 199 connected therewith.

When the bolt 258, however, is positioned in the path of travel of the extension 261 of the member 262, as just described, which it will be recalled takes place in the absence of a container in the circular feed chute 64, the return movement of the member 262 is arrested and it is held in the position illustrated in Fig. 26. When in this latter position an enlarged circular edge 266 located intermediate the tooth 263 and the eye 264 of the member 262 lies beneath the end of pawl 212 and disengages it from the tooth 215 of the ratchet wheel 203 as the arm 204 swings the pawl over the edge of the member 262. Upon the following forward movement of the arm 204 (counter-clockwise), the pawl 212 rides idly over the member 262 and no engagement between the moving arm 204 and the shaft 199 takes place. The shaft 199 not being actuated, the feeding rollers 167 and 168 remain in a stationary position and no feeding of the strip 166 takes place.

As soon as a container part 65 has moved into position adjacent the block 221 it will be engaged by the block upon its next inward movement through the slot 223 and further movement of the arm 222 being stopped, the arm 257 remains in the position illustrated in Fig. 23 with its screw 258 out of alignment with the projection 261 of the member 262. The spring 265 is thus unrestricted in its movement and the member 262 assumes the position illustrated in Fig. 25 wherein the pawl engages the tooth 263 and one of the teeth 215 of the ratchet wheel 203.

By providing a positive return movement of the member 262, its projection 261 is backed away from the screw 258 and the detecting operation of the block 221 takes place to shift the arm 257, if conditions in the chute 64 so permit.

To insure that the shaft 199 does not overthrow or move further than the exact movement required for the advance of the strip 166, there is fixed on the shaft a brake collar 267 (Figs. 22 and 23) which is engaged by a pair of brake shoes 268 pivoted at 269 on a bracket 271 connected with the bracket 202. The opposite ends of the shoes 268 are yieldingly connected by a bolt 272 passing through openings in the ends of the shoes 268, this bolt confining a coil spring 273 between one of the shoes and a nut 274 threadedly engaged therewith in the usual and preferred braking manner.

The strip 166 is pushed by the feeding rollers 167 and 168 over the lower stationary die elements of a series of operating stations. As illustrated in Figs. 13 and 27, this strip 166 passes through a longitudinal slot 281 formed in a guide plate 282 mounted on a die block 283 in turn supported on a bolster plate 284 carried upon and supported by the table 51. The die block 283 and the bolster plate 284 are common to all of the stationary die parts comprising the mechanism at the stations arranged along the path of travel of the strip 166 and these parts are secured directly to the table 51 by bolts 285.

The strip 166 after passing through the slot 281 is further advanced over the upper surface of a plate 286 and through a slot 287 extending through a plate 288 which is connected with a plate 289 in turn secured to the die block 283. A part of the strip 166 as it passes over the plate 286 is subjected to a series of drawing operations, there being disclosed in the drawings by way of illustration, four drawing mechanisms arranged adjacent to each other.

The lower die elements connected with these mechanisms comprise dies 291 which are in the form of bushings vertically inserted in the plate 286 and these bushings are supported upon a transverse plate 292 (Figs. 27 and 28) positioned on shoulders 293 formed in the side walls surrounding an opening 294 extending centrally through the die block 283. Lower die members 295 are provided, consisting of hardened steel rods each of a different diameter, each rod fitting within its respective sleeve 291. These rods are mounted upon a support plate 296 which is normally held in a raised position by coil springs 297 interposed between the lower surface of the plate 296 and a block 298 resting upon the bolster plate 284, and secured to the die block 283 by screws 299.

The different die members 295 fit closely within the openings of their die bushings 291 and act as stripping elements which function following the drawing operations performed on the strip 166 at these stations. The lower die members just described cooperate with moving punch members comprising drawing punches 301 of different diameters, the diameter of each punch corresponding to the inner opening of the particular bushings 291 positioned directly beneath.

These punch members 301 are carried in a punch block 302 supported on a crosshead 303 (Figs. 9, 10 and 27) formed integrally with the slide head 56. As the slide head 56 is lowered the punch members 301 are brought into contact with the positioned strip 166 resting on the plate 286. To insure rigidity of the parts and accurate alignment, front and rear pilot pins 300 (Figs. 10 and 13) are mounted on the die block 283 and these slide within aligned, vertical openings formed in the crosshead 303. A clamping plate 304 (Figs. 27 and 28) surrounds the lower ends of the punches 301 and is carried on rods 305 which are secured to the punch block 302 and springs 306 surround the rods and provide a yielding connection between the plate 304 and the punch block.

The plate 304 first engages the upper surface of the strip 166 as the slide head moves downwardly and clamps it securely on the plate 286 and this clamping action is then followed by the engagement of the punches 301 against the strip. The resulting cooperation between these punches and their corresponding bushings 291 results in a certain drawing of the metal in the strip, the springs 306 yielding to permit this continued movement of the punches through the held plate 304.

The first draw punch 301 (Fig. 28) cooperating with its die bushing 291 draws a relatively large cupped projection 307 in the strip 166. The second pair of punch and die members engages the projection 307 formed at the first station and alters it to form a deeper projection 308 of smaller diameter. In like manner the drawn section 308 is altered by the succeeding punch and die parts to produce a drawn section 309 and this in turn is further reduced in diameter and increased in depth to form a drawn section or protuberance 311. This protuberance 311 is produced in this manner by a series of operations to prevent cracking of the metal in the strip 166.

A protuberance after being fully formed at the last drawing station intermittently moves with the advancement of the strip 166 along a slot 312 formed in the upper surface of the plate 286 and thence through a similar slot 313 formed in the plate 288 to a blanking station where an opening lever is cut from that part of the strip 166 which surrounds the protuberance. This protuberance thus becomes a vital part of the opening lever as will be more fully understood as the description proceeds.

The sliding head 56 (Figs. 9 and 10) is pivotally connected through a trunnion block 321 with an arm 322 of a toggle lever, an opposite arm 323 being fixed to a rock-shaft 324 journaled in bearings 325 formed in the transverse plate 58 and in a bearing 326 formed in a bracket 327 mounted upon one of the side frames 54. The rockshaft 324 carries an arm 328 pivotally connected at 329 to a rod 331 secured to an eccentric strap 332 operating over an eccentric 333 carried by the crankshaft 126.

The mechanism at the opening lever blanking station comprises a lower die cutedge 340 (Figs. 27 and 28) formed in the plate 288 and the strip 166 rests on top of this cutedge. In such position the protuberance extends downwardly into the opening of the cutedge and the latter cooperates with a blanking punch 341 located in axial alignment therewith and carried on the crosshead 303. A clearance opening 342 formed in the plate 288 above the passageway 287 permits passage of the blanking punch 341 which is moved downwardly onto and through the strip 166 during the blanking operation. A partially formed opening lever 343 (Fig. 1) results from this action such an opening lever with its protuberance being removed from the strip at each descent of the blanking punch 341 providing the feeding of the strip is not stopped by the absence of a container part, as previously described.

The lever 343 is deposited by the punch 341 on a shouldered guideway 344 cut in the plate 289. The protuberance 311 projects downwardly within a longitudinal slot 345 formed in the plate 289 and connected with the guideway 344. From this position, the opening lever 343 is next moved transversely of the strip by a transverse or secondary feeding device which advances it into an assembling station arranged along the path of travel of the container part 65 as will be hereinafter fully described.

As illustrated in Figs. 1, 27 and 28, the strip 166 after passing through the blanking station and after having the opening levers 343 removed therefrom becomes a mere skeleton of a strip 346 which contains blanking spaces 347 from which the opening levers have been removed. It will be understood that an opening lever is removed after each advance movement of the strip 166 and the resulting blanking spaces, therefore, lie closely adjacent one another.

The exact definite contour of the edge of each space is utilized to positively align the strip prior to each descent of the crosshead 303. This alignment is accomplished by a pilot member closely registering at successive strokes of the crosshead within adjacent spaces which are in advance of those sections of the strip being drawn to provide the protuberances 311 or being blanked to provide the opening levers 343.

A pilot member 351 (Figs. 27 and 28) is secured to the crosshead 303 adjacent the punch member 341 and on the downward movement of the crosshead passes freely into a vertical slot 352 and into that particular space 347 in the strip 166 which is at that time in aligned position. During this movement of the member 351 into the strip the feeding rollers 167 and 168 are separated and the strip is free to accommodate itself to the new aligned position.

The advancing skeleton end 346 of the strip 166 moves to a position forward of the pilot 351 and, at a distance of several spaces, the end comes into a cutoff device. This device comprises a cutedge 355 which cooperates with the front edge of the plate 288 and cuts off the end of the skeleton strip 346 at each downward stroke of the crosshead 303. Thus a small end piece 356 (Fig. 27) is removed and such a piece is in width, equal to the distance the strip moves each time. This piece falls by gravity through aligned openings 357 formed in the die block 283, the bolster plate 284 and the table 51. Clogging or jamming of the strip within the dies is thus prevented.

Reference should now be had to Figs. 27 to 35 incl. which show the transverse or secondary feeding device for conveying the formed opening lever 343 from the blanking station where it was deposited in the passageway 344, as described, to the assembling station where it meets a container part 65. This feeding device includes reciprocating members which advance the opening lever 343 in a step by step movement along its path of travel.

A lower sliding bar 365 constitutes one of the reciprocating members and is supported at its rear end on the die block 283 (Fig. 29) and at its forward end on a bracket 368 (Fig. 30) bolted to the table 51. This bar 365 is connected by a spacer block 369 (Fig. 34) with a lateral extension 371 projecting from one side of an upper sliding bar 372 constituting another reciprocating member.

The sliding bars 365 and 372 are confined within an enclosure which extends from the blanking station of the opening lever to the assembling station of the container part and which is positioned within a bridge member 375 (Figs. 11, 29, 30, 32, 33 and 34) which rests upon the die block 283 at its rear end and at its forward end upon a die block 376, of the assembling station mechanism which is supported by the table 51.

The bar 365 slides back and forth within a guideway 377 (Figs. 30 and 33) cut in the bridge member 375 and the bar 372 slides back and forth within a similar guideway 378 located centrally within a cover plate 379 mounted upon the bridge member 375 and held in position by screws 380 (see Figs. 11, 13 and 32). Bridge member 375 is transversely slotted at 381 (Fig. 34) to permit free movement of the spacer block 369 and a similar slot 382 is located in the cover plate 379 adjacent the slot 378 to permit free sliding movement of the projection 371. The slots 381 and 382 extend longitudinally a distance slightly in excess of the stroke or feeding movement of the bars 365 and 372 (Fig. 11) for this purpose.

It will be evident that this construction entirely encloses the feeding bars 365 and 372 and as will now be explained the opening lever 343 during its passage from the blanking station to the assembling station will transverse a plane intermediate the sliding bars 365 and 372.

When the blanking punch 341 deposits the opening lever 343 within the shouldered passageway 344 (Fig. 29) the feeding bar 365 is in a backward position. To effect the first advance movement of the opening lever, the bar 365 is moved forward and a fixed feed dog 385 secured to the bar engages back of the opening lever 343 and moves it along the passageway 344 and onto a grooved track 386 (Figs. 33 and 34) formed centrally of the bridge member 375 and constituting a continuation of the passageway 344 of the die block 283.

In this advanced position, the opening lever 343 is engaged from above by resilient members located within the bridge 375, these members clamping it downwardly against its track 386. These resilient members comprise a series of plates 387 (Figs. 29, 30, 33 and 34) positioned above and spaced on opposite sides of the track 386 and arranged in pairs which extend throughout substantially the entire length of the bridge member 375. During each step advancement of the opening lever 343 it is moved from one pair of holding plates to an adjacent pair of plates.

Each plate 387 is formed with a circular outer edge 388 which constitutes a pivot, this rounded edge resting in a pocket formed in a lower block 389 and an upper block 391, both blocks being supported within the bridge member 375 and held in position by the cover plate 379. While there are a series of relatively short plates 387 on each side and arranged end for end, these are pivotally held in position along each side by a single bar 389 and a single bar 391 which extend throughout the length of the bridge member 375.

The block 389 is relieved along its inner face to permit a slight movement of the plate 387 between it and the block 391. Block 391 extends above or overhangs each plate and limits its upward movement. Springs 392 (Figs. 30 and 34) are set in the upper blocks 391 and rest upon the upper surfaces of the inner or free edges of the plates 387.

Throughout the forward movement of the opening lever 343 along the track 386, it slides beneath the spring pressed plates 387 which assist in providing a confined passageway permitting the advance movement of the opening lever but preventing its backward movement when the feeding bars return on their backward stroke.

In its first advance position, the opening lever 343 is again engaged this time by a spring held feed dog 395 (Fig. 29) which is pivoted at 396 on the lower bar 365 and which is located within a slot 397 cut in the bar, it being understood that the bar is advancing forward from its backward position during such engagement. The feed dog 395 is held in a normal raised position by a spring 398 interposed between an extension thereof and the bar 365. During its second advancement, the opening lever 343 is moved along the track 386 and deposited within a second pair of holding plates 387.

Following the first two movements of the opening lever 343 by the respective dogs 385 and 395 just described, it is further engaged and further advanced by other feed dogs carried by the upper bar 372.

The bar 372 (Figs. 29 and 30) carries a series of spaced feed dogs 401, each dog being pivoted on the bar at 402 and operating within a slot 403 formed therein. Each feed dog 401 is normally held in a lowered or extended position by a spring 404 interposed between the bar and an extension on the dog. Upon forward movement of the bars 365 and 372 each feed dog 401 engages behind each opening lever 343 present in that part of the transverse feeding device and advances it therewith, each opening lever in this manner being conveyed along its track 386 in a step by step movement by successive engagement of the adjacent feed dogs 401.

The bars 365 and 372 (Figs. 10 and 29) are moved back and forth within their guideways by connection with the cam shaft 123. For this purpose, the bar 365 at its rear end is connected by a rod 405 with the upper end of an arm 406 of a bellcrank lever 407 mounted on the fixed shaft 185. A second arm 408 formed integrally with the bellcrank lever 407 carries a cam roller 409 which operates within a cam groove 411 of a face cam 412 secured to the shaft 123. Rotation of the cam 412 and rocking of the bellcrank lever 407 provides the proper reciprocation for the transverse feeding device to advance the opening lever as just described.

A transverse member 415 (Figs. 30 and 32) is connected to the forward end of the bridge member 375 and is provided with a tapered slot 416 through which the opening levers 343 are moved off of the end of the track 386. The foremost feed dog 401 upon advancing with an opening lever projects it through the slot and into the grip of a transfer arm 417 which at such time is positioned to receive it. During this last movement of the lever it is held against sidewise displacement by a plate 399 projecting beyond and secured to the forward end of the bar 372.

An outer extremity or head 418 (see also Figs. 35 and 36) of the arm is slotted along its lower surface as at 419 to provide a pocket for the reception of the opening lever 343. On this head 418, two holding plates are positioned, one being a spring plate 421 which is normally held against the under surface of the head by a pair of springs 422, each spring being located on a stud 423 threadedly engaged within the head of the arm 417, the head of each stud confining its spring and permitting it to exert an upward pressure on the plate 421. Each stud 423 projects through an enlarged opening formed in the plate for this purpose.

The outer end of the plate 421 extends under and beyond the slot 419 and is provided with a depressed portion 424 through which the protuberance of the opening lever 343 moves as it leaves its track 386 and passes into the slot 419. The second holding plate comprises a spring-held plate 425 mounted adjacent the plate 421 and yieldingly held against the lower surface of the head 418 in an identical manner. The outer end of this plate 425 also extends under and beyond the slot 419 and the opening lever 343 as it reaches its position within the slot 419 of the arm is held clamped against the under surface thereof by the spring held plates 421 and 425.

The arm 417 (Figs. 30 and 32) is pivoted on a vertical pin 431 held in a bracket 432 secured to and mounted upon the front edge of the die block 376 and as the arm shifts on its pivot, its head 418 moves between limit stops which comprise spaced screws 433 and 434 threadedly engaging spaced lugs 435 and 436 projected from the transverse member 415.

These screws are adjustable within their lugs and definitely locate the arm in one or the other of two positions, these positions being the opening lever receiving position and a position where the opening lever is correctly located within the assembling station.

Movement of the arm 417 about its pivot 431 is effected by an actuating mechanism operating through a yielding connection as illustrated in Figs. 30 and 32. The arm is provided with spaced bosses 437 and 438 in which sliding pins 439 and 441 are located, these being normally urged together by springs 442. Pins 439 and 441 are respectively provided with heads 443 and 444 which rest against opposed faces of a block 445 carried on the lower end of an arm 446 (see also Figs. 8 and 9). The upper end of the arm 446 is pivoted on a stud 447 held in a bracket 448 screwed to bearing arms 120 of the arch frame 53.

The arm 446 intermediate its length carries a stud 449 on which is mounted a cam roller 451 which operates in a groove 452 (Fig. 10) of a cam 453 carried by the crankshaft 126. Shifting of the arm 446 under the action of the cam 453 moves the arm 417 against one or the other of its limit stops which brings the head 418 to an exact position irrespective of the movement of the arm 446, the yielding nature of the springs 442 compensating for any differences.

With this present understanding of the blanking, forming and transfer of an opening lever and its exact positioning at the assembling station, it is now proper to go back in the description to the container part 65 which was delivered from the circular chute 64 into the feeding fingers 91 for intermittent advancement through the various operating stations positioned relative to the line of travel of the container part.

As illustrated in Figs. 8 and 11, the container part 65 at the first or idle station is brought to rest upon a block 455 mounted upon the table 61 and is held in place by a projecting leaf spring 456 secured to the lower end of the frame 63. It is in this position that the first pair of fingers 91 clasp the container part to move it forward into the first operating station.

The five operating stations, previously mentioned, are provided with lower die blocks all carried on the table 51 and arranged adjacent one another and these form supports for some of the mechanism, the advancing container part being conveyed over and across these blocks. A die block 461 secured by bolts 462 to the table 51 is associated with the first operating station. A die block 463 is mounted adjacent and is secured by bolts 464, this being associated with the second operating station.

The third station which is the assembling station has its die block 376, previously referred to, secured in position by bolts 466. A die block 467 secured to the table 51 by bolts 468 is associated with the fourth station and the last or fifth station has its die block 469 secured by bolts 471.

The lower mechanisms carried by these five die blocks cooperate with movable punch members which are carried upon the sliding head 55. This head is adapted to move up and down and for this purpose is pivotally connected to a pair of pitmen 475 (Fig. 8) this connection being made on pivot pins 476 carried by brackets 477 bolted to the head. The upper end of each pitman 475 pivotally engages a crank 478 formed in the crankshaft 126, a pitman cap 479 being bolted to the end of the pitman for this purpose.

The container part 65 upon being moved from the idle station to the first operating station is positioned in axial alignment with a lip locating device where it rests upon a plate 481 (Figs. 16, 17 and 18) secured by screws 482 to the upper surface of the die block 461. This plate is provided with a pair of circular slots 483 which are concentric with the vertical axis of the principal mechanism at this station. Each slot 483 extends through something less than 90° and communicates at its inner end with an elongated slot 484.

Locating members are adapted to move toward each other along and within the slots 483 for the purpose of engaging the projecting lip 66 of the container part 65 and shifting it axially to an exact predetermined position on the plate 481. These locating members include a finger 485 projecting through one of the slots 483 and extending above the surface of the plate 481 and this finger is an integral part of an arm 486 formed integrally with a sleeve 487 oscillating within a vertical bore 488 formed in the die block 461. The arm 486 and finger 485 move freely within a circular depression 489 formed in the die block 461, this depression being entirely covered by the plate 481 excepting for the slots 483.

The sleeve 487 is keyed to a cup member 491 provided with a flange 492 and oscillating within a vertical bore 493 formed in the die block 461. The flange 492 is cut back on one side (the left-hand side in Fig. 16) as at 494 and the bottom surface on this side is above the bottom surface 495 on the thick side of the flange. This provides two vertical shoulders 497, as indicated in Fig. 16a. A second sleeve 498 is mounted directly beneath the sleeve 491 and within a vertical bore 499 formed in a housing 501 mounted on a bracket 502 secured to the under surface of the table 51. The sleeve 498 is also provided with a flange 503 which interlocks with the flange 492 of the sleeve 491, a projecting tongue 504 (Figs. 16a and 17) formed in the flange extending upwardly into the relieved part 494 of the flange 492. This construction provides a slip joint between the sleeves 491 and 498.

A second finger 505 of the locating members projects through the other slot 483 and also extends above the surface of the plate 481 and is an integral part of an arm 506 secured to the upper end of a shaft 507 rotatably mounted within the sleeve 487. The lower end of this shaft is pinned to a block 508 positioned within the cup member 491. The block 508 on its bottom surface is relieved at 509 providing two shoulders 510 which are utilized for a slip connection similar to that between the sleeves 491 and 498. In the present instance a tongue 511 extends upwardly from a head 512 formed on a vertical shaft 513 mounted centrally of the sleeve 498 and this tongue interlocks with the block 508 to provide the slip connection between the shafts 507 and 513.

A spring 514 is wrapped around the upper end of the shaft 507, and one end of the spring engages the arm 506 while the other end engages the arm 486. This spring urges one of the shoulders 497 of the cup member 491 against the interlocked tongue 504 of the sleeve 498 and also urges one of the shoulders 510 of the block 508 against the interlocked projecting tongue 511 of the shaft 513. As will be later described, the parts 498 and 513 constitute positively actuating members and the slip joints just described provide yielding connections for the fingers 485 and 505.

The fingers 485 and 505 (Figs. 17 and 18) are at all times urged toward each other by the spring 514 and they so move along their slots 483 only when oscillations of the sleeve 498 and the shaft 513 permit. When this takes place the sleeve and shaft move through their respective angles of oscillation, this, however, being in excess of the possible movement of the fingers and the fingers are blocked toward the end of their stroke by the lip 66 of the container part coming into located position. When this takes place the slip joints come into action, the tongue 504 leaving its shoulder 497 and the tongue 511 likewise moving away from its shoulder 510.

In the reverse movement of oscillation of the sleeve 498, its tongue 504 moves back into engagement with the shoulder 497 (Fig. 16a) and in a similar way the tongue 511 moves back into engagement with the shoulder 510. Further movement of these members 504 and 511 back up the engaged members 498 and 508 and return the fingers 485 and 505 backwardly along their slots 483 into normal position, this movement taking place against the action of the spring 514. This construction, besides being efficient in locating, affords a safety device in the event of a jamming or improper movement of the container part in its lip locating operation.

It will be understood that the lip 66 of the container part 65 may extend in several relative positions as the container part is brought to rest at this first operating station but regardless of the position, the fingers 485 and 505 move toward each other and one or the other will engage the lip and shift the container part 65 on its own axis to proper position. In such a position the lip is located over a piercing and slotting die member 521 resting within the circular depression 489 and connected with a die block 522 which sets upon a flange of the die member 521. Both members 521 and 522 are secured to the die block 461 by a bolt 523. The fingers 485 and 505 in their innermost position engage the opposite side walls of the die block 521.

The sleeve 498 (Figs. 16 and 17) and the shaft 513 are connected by a train of gears with a cam controlled actuating device operating in synchronism with the various operations of the machine. Sleeve 498 carries a gear 525 which meshes with a gear 526 keyed to a vertical shaft 527 journaled in a bearing 528 formed in the housing 501 and in a bearing 529 formed in the bracket 502.

The shaft 513 carries at its lower extremity a gear 531 which meshes with an idler gear 532 (Fig. 19) turning on a vertical stub shaft 533 (see also Fig. 16) secured within a boss 534 formed in the bracket 502. The gear 532 also meshes with a gear 535 also keyed to the shaft 527 adjacent the gear 526. By reason of this gear train oscillation of the shaft 527 imparts a different direction of rotation to the sleeve 498 and the shaft 513 but insures the same rate of travel.

The shaft 527 (Figs. 16 and 17) carries at its lower end a bevel pinion 541 which meshes with a bevel gear 542 keyed to a rockshaft 543 moving in bearings formed in lugs 544 projected from the bracket 502. An arm 545 is keyed to the rockshaft 543 and is pivotally connected at 546 to one end of an adjustable connecting rod 547 the other end of which is pivotally connected at 548 with an arm 549 (see also Fig. 10) of a bellcrank lever 551 mounted for operation on the shaft 185. An arm 552 of the bell-crank lever 551 carries a cam roller 553 which operates in a cam groove 554 formed in a face cam 555 keyed to the cam shaft 123.

All of the movable punch mechanism for piercing and slotting the container part lip is housed within a punch block 561 (Figs. 8, 16 and 20) which is provided with a stem 562 clamped within a block 563 vertically adjustable within a slot 564 formed in the sliding head 55. For accurate adjustment there is provided a threaded screw 565 freely rotatable in a plate 566 positioned at the top of the slot 564 and held on the slide head. Spanner holes 567 permit rotation of the screw 565 and after adjustment it is clamped within the block 563 by bolts 568.

The punch block 561 (Fig. 16) is secured by bolts 571 to a collar 572. The inner diameter of the collar 572 toward the lower end of the collar is reduced to provide an opening 573 thus providing an annular shoulder on which rests a flange 574 formed on the upper end of a clamping ring 575 movable within the opening 573. The clamping ring 575 is normally held in extended position with its flange 574 against the shouldered collar 572 being so held by springs 576 interposed between the upper surface of the collar 575 and the lower inner surface of the punch block 561.

The ring 575 slides on pins 577 held in fixed position at their upper ends within the block 561, these pins extending into vertical bores 578 in the collar 575. A knockout pad 579 is positioned in a central opening 581 formed in the clamping ring 575 and is threadedly secured to a vertically extending stem 582 passing through a central opening 583 in the punch block 561, the upper end of the stem 582 being surrounded by a spring 584 seated in a counter bore in the stem 562. The lower end of the spring rests on the punch block 561 while its upper end engages a nut 585 threadedly secured to the upper end of the stem 582.

A container part holding pin 586 is vertically movable through the center of the pad 579 and its head is engaged by a spring 587 extending within a channel 588 formed centrally of the stem 582. Under the full action of the spring 587, the pin 586 is held extended, its head resting upon the top of the punch pad 579.

As the slide head 55 moves downwardly carrying the punch block 561 and its associated parts, the projecting pin 586 engages the top of the container part 65 at its vertical center and holds the same in position within the station. This engagement with the container part 65 takes place immediately following its deposit and assists in the release of the feeding fingers 91 from the container part. The pin 586 being on the vertical center of the container part in no way interferes with its rotation during locating of its lip as already fully described.

The descending clamping ring 575 moves over the container part 65, the ring being provided with an annular recess or pocket 591 which permits this action. Upon reaching the plate 481 the ring is arrested in its movement while the punch block 561 continues its lowering movement, the collar 572 sliding along the clamping ring 575.

A circular block 592 is located within the collar 572 directly above the ring 575 and is held against the lower surface of the punch block 561 and this block carries a slotting punch 593 which projects downwardly and into a vertical slot 594 extending through the clamping ring 575. The block 592 in like manner carries a perforating punch 595 which also projects downwardly and which extends into a vertical bore 596 formed in the ring 575 adjacent the slot 594. When the clamping ring 575 reaches its clamping position the punch 593 and the pin 595 move through their respective openings and engage the upper surface of the lip 66 of the container part 65.

The block 521 (Figs. 16 and 18) is provided with a vertical opening 597 which is in axial alignment with the bore 596 and is also provided with a vertical slot 598 which is in axial alignment with the slot 594. The slotting punch 593 as it moves downwardly passes through the middle of the lip 66 and cooperating with the slot 598 removes a portion of the metal from the lip thereby producing a slot 601 (Fig. 3) therein. At the same time the perforating pin 595 cooperates with the opening 597 as it passes through the lip and produces a perforation 602 therein.

The die block 521 is provided with a vertical channel 603 which communicates at its upper end with the openings 597 and 598 and the metal removed from the lip 66 in the slotting and perforating operations fall into and through the channel 603 and through an aligned channel 604 formed in the die block 461 and thence passes out of the machine as scrap. It will be understood that during the operation just described the knockout pad 579 has come to rest on the upper surface of the container part 65 in which position it securely holds the same during perforating and slotting.

The punch block 561 is then raised and its collar 572 engages the flange 574 of the clamping ring 575 and lifts it during which time the perforating punch 595 and the slotting punch 593 move back and away from the lip 66 passing back into their respective openings.

Provision is made for depressing the stem 582 and the knockout pad 579 before the punch block 561 reaches its uppermost position. As illustrated in Fig. 20, the block 563 is slotted in front as at 605 to accommodate a bellcrank lever 606 pivoted at 607 to the block. The inner arm of the bellcrank lever rests upon the upper end of the stem 582 and the other arm is cam shaped as shown at 608. A cam block 609 is bolted to a transverse bar 610 which extends across the front of the slide head 55 and is secured at opposite ends to the side frames 54. As the bellcrank lever 606 is lifted with the punch block, its cam 608 engages the cam 609 and thereupon the lever rocks about its pivot 607 and depresses the stem 582 and the pad 579 and strips or knocks off the perforated and slotted container part 65.

It is essential that the punch block 561 be accurately guided relative to the die block 461 at this station and for this purpose there is provided a front pilot pin 611 (Figs. 8, 11 and 16) and a rear pilot pin 612 both carried by the punch block 561. These pilot pins are lowered with the downward movement of the slide head 55 and engage within respective openings 613 and 614 formed in the die block 461.

The next operating station in the path of the advancing container part 65 is a redrawing station illustrated in section in Fig. 16. A fixed die plate 621 is mounted on the upper surface of the die block 463 and partially encloses an anvil block 622 also mounted on the die block. The container part 65 is brought to rest in axial alignment with the anvil block 622, its lower edge moves on to the the upper surface of a draw ring 623 also located within the plate 621 and surrounding the anvil block 622. The draw ring 623 is provided with a shouldered flange 624 which normally engages beneath the plate 621 in which position its upper surface is in the same horizontal plane as the upper surface of the plate.

Vertical vent holes 625 are formed in the anvil block 622 and these communicate at their lower ends with a transverse vent passageway 626 formed in the anvil block and communicating with similar holes in the die block 463 leading to the outside atmosphere. This construction allows the escape of air during the drawing action taking place at this station.

The draw ring 623 is secured to vertical pins 627 which extend downwardly through vertical bores 628 passing through the die block 463, the pins being secured at their lower ends in a collar 629. A vertically extending bolt 631 is threadedly secured to the die block 463 and extends downwardly through the collar 629, a drawing rubber 632 and a collar 633. A nut 634 threadedly secured to the lower end of the bolt 631 confines the parts 629, 632 and 633 together and provides an adjustment for varying the compression on the drawing rubber 632, this being standard press construction.

The movable punch parts associated with this station are carried in a punch block 641 (Figs. 8 and 16) provided with a stem 642 which is clamped within a block 643 adjustably held in a slot 644 formed in the slide head 55. A threaded stem 645 provides an adjustment for the block 643 in a manner identical with that of the adjustable connection of the stem 562. The block 643 is bolted securely to the slide head 55 in a similar manner.

Punch block 641 is connected with a washer 646 and with a collar 647 by means of bolts 640 and these three members enclose the working parts of the upper die mechanism at this station. The collar 647 is provided with a reduced diameter 648 which provides a shoulder for the reception of a flange 649 formed on the upper end of a clamping block 651 vertically movable within the collar. A vertical stem 652 is threadedly secured to the block 651 and extends centrally through the members 641 and 646 and a spring 653 is positioned on the stem 652 resting at its lower end against an enlarged part thereof and at its upper end against a wall of the stem 642. This spring normally holds the block 651 in its lowered position with its flange 649 resting on the shoulder adjacent the opening 648 of the collar 647, its position being illustrated in Fig. 16.

A holding pin 655 is located in a central bore 656 formed in the block 651 and its head is engaged by a spring 657 located within a vertical channel 658 formed in the stem 652, the upper end of the spring resting against a wall of this stem. As the punch block 641 is moved downwardly by lowering of the slide head 55, the projecting pin 655 engages the positioned container part 65 at its center and holds it against the draw ring 623 while the feeding fingers 91 release the container part and while further operations take place.

The descending punch block 641 next carries the block 651 into engagement with the upper surface of the container part 65. The lower surface of the block 651 corresponds in size and shape with the upper surface of the container part and this insures a tight holding action. The spring 653 yields when the block reaches its position on the container part and while it remains stationary the lower surface of the washer 646 engages the upper surface of the block 651, the collar 647 moving downwardly over the side walls 67 of the container part 65 and along the block.

When the collar 647 engages the extending flange of the container part 65, it forces the container part and the draw ring 623 downwardly against the resisting action of the drawing rubber 632. In this manner the container part is brought over the anvil block 622, the upper surface of the anvil block being shaped to correspond to the interior top wall of the container part and this insures a tight fit between the nesting parts. The container part is in this way clamped between the block 651 and the anvil block 622 before the full downward movement of the punch block 641 takes place.

The remaining relative movements between the punch and die parts draws a portion of the container part flange upwardly and into the vertical wall 67 thereof which in this way is increased slightly in height. The effect of this drawing action is to produce a container part illustrated in Fig. 4 wherein the slot 601 is positioned partially within the vertical wall 67.

Upon the punch block 641 being raised, the drawing rubber 632 restores the ring 623 to its upper position, stripping the container part 65 from the anvil block 622. This lifting of container part 65 takes place while the punch block 651 is still in contact with its upper surface and as this punch block continues its upward movement the stem 652 is engaged by a knockout lever 659 (Fig. 8) carried by the block 643 and strips the container part from the collar 647. This knockout lever is identical in construction with the lever 606 and operates in the same way, it being engaged by a cam secured to the inner face of the bar 610 at this point.

The next operating station is the assembling station at which the opening lever 343 is held in the transfer arm 417 as previously described. At this station the container part 65 is brought to rest upon a plate 671 (Fig. 36) mounted upon and secured to the die block 376. The die block 376 is provided with a central chamber 672 in which is positioned an anvil 673 carrying a cap member 674 provided with a stem 675 extending into a vertical channel 676 formed in the upper surface of the anvil 673.

The stem 675 carries a pin 677 which projects into an elongated slot 678 cut in the anvil 673 and this permits relative movement between the cap member and the anvil while at the same time preventing displacement. The cap member 674 is normally held in its outward position by a spring 679 interposed between the stem and the anvil and this construction provides a yielding cushion for the container part 65 and assists in the clinching of the opening lever upon the lip of the container part as will be hereinafter fully described.

The anvil 673 is secured to the upper end of a vertical shaft 681 and is held against rotation by a pin 680 fixed in the die block 376 and projecting in a vertical slot 670 formed in one wall of the anvil. The shaft 681 moves up and down in a tubular member 682 which connects with an upper and lower web 683 (Figs. 8, 9 and 10) joined to four spaced vertical sleeves 684. The members 682, 683 and 684 form an independent toggle frame which is positioned below the table 51 and which is bolted thereto. Vertical studs 685 are provided for this purpose and are fastened at their upper ends in the table 51 and are projected through the sleeves 684, nuts 686 being threadedly secured on the ends of the studs and clamping the frame securely in position.

The lower end of the shaft 681 is formed with an enlarged head 687 (Fig. 36) which slides freely within the lower end of the tubular member 682 and a pin 688 carried thereby forms a pivot for one arm 689 of a toggle system (see Figs. 8 and 9). The arm 689 (Fig. 9) is also pivoted at 691 to the other arm 692 of the toggle and the lower end of this arm is pivoted at 693 on a vertically adjustable block 694 carried on a threaded stem 695 passing through a boss 696 formed in the lower web 683. Locknuts 697 are threadedly secured on the stem 695 on opposite sides of the boss 696 and firmly clamp the stem and its head in a predetermined vertical position relative to the toggle frame.

The arm 692 is pivotally connected at 698 to a connecting rod 699 pivoted at 701 to the lower end of an arm 702 (see also Fig. 10) formed integrally with a sleeve 703 movably mounted on the shaft 185. This sleeve (Fig. 13) carries an arm 704 which carries a cam roller operating in the cam groove of a face cam 705 secured to the cam shaft 123.

Operation of the toggle mechanism just described raises and lowers the anvil 673 to assist in the assembling of the container part 65 with the opening lever 343 and takes place in cooperation with movable die mechanism carried on the slide head 55. Such mechanism is supported by and confined within a punch block 711 (Fig. 36) provided with a stem 712 clamped in adjusted position within a block 713 positioned in a slot 714 formed in the slide head 55 (Fig. 8) an adjusting screw 715 being used for this locating purpose. Block 713 is in this way carried on the sliding head 55 adjacent the block 643 of the preceding station.

The punch block 711 (Fig. 36) is provided with a vertical passageway 716 in which is movably carried a telescoping device consisting of three sliding parts arranged along a vertical axis extending above the positioned container part 65. The outermost of these parts is an outer sleeve 717 sliding snugly within the passageway 716 and normally resting in a projected position being so held by a spring 718 interposed between the top part of the sleeve and the top wall of the passageway. Sleeve 717 is formed with a shoulder near its lower end which engages a retaining plate 719 secured to the bottom of the punch block 711 by screws 721.

An intermediate tubular member 722 is the second of the sliding parts and is positioned within the sleeve 717. Its upper end extends through the upper wall of the punch block 711. A threaded plug 723 is secured in the upper end of the member 722 and forms a shoulder which engages the upper end of the punch block 711 and limits the downward or projected position of the tubular member. A spring 724 is interposed between the upper end of the sleeve 717 and a shoulder formed on the member 722 and this tends to normally project the latter and seat its plug 723 upon the upper surface of the punch block.

The third of the sliding parts is an inner stem 725 positioned within the tubular member 722 and this part is shouldered near its center to normally engage a bottom portion of the tubular member 722 and limit the outward and downward position thereof. The stem 725 is formed with a central bore 726 throughout most of its length, in which is positioned a spring 727 interposed between the bottom of the bore and the under surface of the nut 723. The upper end of the spring is held in central position by a pin 728 extending downwardly therein and carried by the plug 723.

When the slide head is at the top position, this being when the container part is coming into the station, the three movable parts 717, 722 and 725 are downwardly projected from the punch block 711 each in its fully extended position. As the slide head 55 begins its downward movement a foot 729 carried by the lower end of the stem 725 first engages the container part 65 as it rests upon the plate 671. This is the position illustrated in Fig. 36.

This action at the assembling station is followed by the shifting of the transfer arm 417 from the position wherein it received its opening lever 343 to a position where the protuberance 311 of the opening lever is in vertical alignment with the perforation 602 in the lip 66 of the container part. In other words, the transfer arm 417 (Fig. 32) is shifted from the position adjacent the limit stop 433 to a position engaging the limit stop 434.

The punch block 711 is provided with a lateral extension 731 (Fig. 36) in the lower part of which is formed a circular chamber 732 communicating with a counterbore 733. A sleeve 734 formed with a circular flange 735 is slidably connected with extension 731, its flange being positioned within the chamber 732 and an extension 736 of the flange engaging within the counterbore. The flange 735 is engaged by springs 737 interposed between it and the upper wall of the chamber 732 and these springs urge the sleeve 734 downwardly into an extended position. Bolts 738 provided with heads 739, extend through the flange 735 and are threadedly held in the extension 731 of the punch block 711, the bolt heads engaging the flange when the sleeve is projected, this preventing its displacement.

A locating pin 741 is slidably positioned within the lower end of the sleeve 734 and its head engages the end wall of a central passageway 742 formed in the sleeve. This pin 741 is normally held in projected position by a spring barrel 743 enclosing a spring 744, both spring and barrel being mounted within the passageway 742. The pin 741 is in axial alignment with the perforation 602 of the positioned container part 65 and as the transfer lever 417 is shifted against its limit stop 434, the protuberance 311 of the opening lever 343 held thereby is in axial alignment and directly beneath the pin.

During the downward movement of the punch block 711, the toggle organization controlling the shaft 681 and its anvil 673 operates to raise the cap member 674 and position it first on the inside of the container part 65 and thence lifts it with the rising anvil. As the cap member 674 fully engages the inside of the container part 65, two projecting pins 751 (Figs. 32 and 36) carried on a lateral extension 752 of the cap member move up on either side of the lip 66 of the container part 65 and center and hold it so that its perforation 602 will remain in vertical alignment with the protuberance 311 of the opening lever 343.

Continued downward movement of the punch block 711 brings the pin 741 into the protuberance 311 of the opening lever and at the same time, the container part 65 is further raised to position its perforation 602 over the protuberance. The head 418 of the transfer arm is notched as at 753 to afford a clearance for the sleeve 734 during this action.

The opening lever at this time is held by a pin 754 (Figs. 32 and 36) which projects upwardly from the lateral extension 752 of the cap member 674 and engages the lever on one side. The protuberance of the lever resting within the perforation 602 of the container part 65 firmly held on the anvil cap 674 also assists in this holding action. This pin 754 in reaching the holding position passed into a slot 755 (Fig. 35) cut in the head 418 of the transfer arm 417. After this engagement between opening lever and container part the transfer arm 417 moves backward and away from holding position, its spring fingers 421 and 425 permitting release of the lever 343.

While this lifting action of the container part 65 is taking place, the telescoping members 717, 722 and 725 are collapsing one within the other while still holding the container part under the foot 729. With the opening lever 343 so positioned on the container part and held between the pins 751 and 754, continued approach of the punch block and the anvil brings the lower end of the sleeve 734 against the upper surface of the opening lever 343 which in turn rests against the lip of the container part, the pin 741 sliding within its sleeve at such time.

Figure 5:
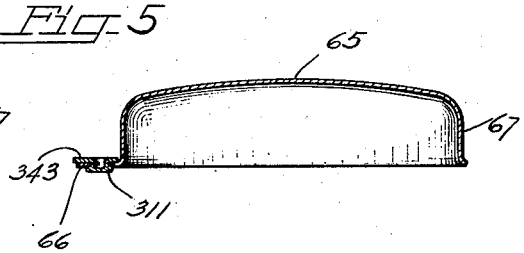
Figure 6:
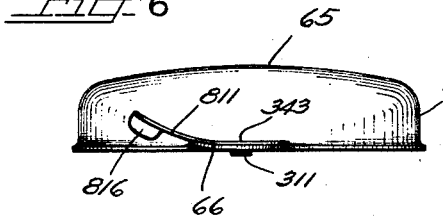

The extension 752 of the cap member 674 is traversed vertically with a bore 756 (Fig. 36) in which a clinching die pin 757 projects, the pin being secured in the anvil 673. The pin 757 is on the same vertical center as pin 741 and the perforation 602 of the lip 66 and the protuberance 311 at this time is brought into the upper end of the bore 756. The descending sleeve 734 presses against the opening lever 343 and the rising container part 65 and as a result of this combined action the cap member 674 moves downwardly relative to the anvil 673 this being against the action of its spring 679 and the upper end of the clinching die pin 757 moving through its bore 756 engages the projecting end of the protuberance 311 and spreads that part of the protuberance which lies beneath the lip 66 of the container part 65. The opening lever 343 is thus clinched or riveted onto the lip 66, the parts being thus pivotally connected as illustrated in Fig. 5.

After the assembling and clinching operations at this station have resulted in the attachment of the opening lever to its container part, the punch block 711, the anvil 673 and parts carried thereby return to their former positions, the container part 65 at such time moving downwardly with the anvil. The foot 729 of the stem 725 during this separation of the parts remains in holding position on top of the container part until the punch block 711 has nearly reached its full upward position.

The plate 671 (Fig. 32) is slotted at 758 to form a clearance for the extension 752 of the cap member 674 and is also relieved at two spaced slots 759. The cap member 674 while generally shaped to fit within the container part 65 is cut back at three spaced sections 761 at which locations its diameter is considerably less than the diameter of the container part 65. The central opening in the plate 671 on the other hand is formed with a smaller diameter between the slot 758 and the slots 759, which construction provides three projecting tongues 762 having their inner faces in a circular line and closely outlining the relieved walls of the cap member. These tongues 762 form a floor on which the container part 65 rested prior to being lifted in the operations just described and it is on to these tongues that the container part is again positioned following the operations at this station.

The container part thus remains on the plate 671 while the anvil 673 carrying its cap member 674 continues its downward movement into the position illustrated in Fig. 36 with the result that the container part is positively stripped from the cap member 674 and left free upon the upper surface of the plate 671 to be engaged by the feeding fingers 91 for advancement to the next station.

The fourth operating station to which the container part 65 with its opening lever 343 is brought, embodies a mechanism which bends a part of the lever body to correspond with the circular shape of the wall 67 of the container part. At this station a finger lip is also struck up from the lever. The container part 65 is brought to rest on a spring supported block 775 (Figs. 37, 40 to 43 incl.) positioned within an opening 776 formed in a plate 777 secured by screws 778 to the die block 467. The block 775 is provided with an extended flange 779 which engages the under surface of the plate 777 being so held by springs 781 interposed between the blocks 775 and 467.

In this raised position, this being the position illustrated in Fig. 37, the upper surface of the block 775 is flush with the upper surface of the plate 777 and these surfaces are also flush with the upper surface of the plate 671 of the preceding station. The lip 66 of the container part 65 resting on the block 775 at this station extends over a die member 782 located in the opening 776 and resting upon the die block 467 being held in position by screws 783 (Fig. 42).

The upper movable mechanism associated with this station is carried by and confined within a punch block 785 provided with a stem 786 clamped in an adjusted position within a block 787 (Fig. 8) being confined within a slot 788 formed in the slide head 55 adjacent the slot 714. An adjusting screw 789 permits the adjustment of the block 787 relative to the slide head.

The punch block 785 (Fig. 37) carries a collar 791 in which is movably positioned a clamping ring 792 having a shouldered flange 793 at its upper end which normally engages the upper surface of the ring 791 as the ring or collar 792 is held outwardly projected by outside springs 794 and a center spring 795 interposed between the punch block 785 and the ring 792. An annular chamber 796 is formed centrally of the punch block 785 to accommodate the flanged end of the clamping ring and a similar depression 797 formed in the punch block 785 encloses the spring 795.

A sleeve 798 extends through the vertical center of the punch block 785 and the clamping ring 792 and is enlarged at its bottom end to form a foot 799, the lower surface of which is shaped to correspond to the upper top surface of the container part 65. A pin 801 having a head 802 projects centrally through the lower end of the sleeve 798 and through the foot 799 and its head 802 is engaged by a spring 803 positioned within the sleeve, the top end of the spring engaging a button 804 pinned to the upper end of the sleeve.

As the punch block 785 is lowered by the moving slide head 55, the projecting pin 801 first engages the top of the container part 65 resting upon the block 775 and holds it in position while the feeding fingers 91 release it and return on their idle feeding stroke. The downwardly moving punch block 785 then positions three projecting pins 805, 806 and 807 (Figs. 37 and 41), all carried on the clamping ring 792, alongside of the container part 65 confining its lip 66 between the fingers 805 and 807 and holding its opening lever 343 between the fingers 805 and 806. This accurately positions and holds these parts while the punch parts continue their downward movement.

The lower edge of the clamping ring 792 directly above the opening lever 343 is provided with a rounded surface 808 (best seen in Fig. 42) which corresponds to a similar die surface 809 formed on the upper face of the die member 782. As the clamping ring 792 reaches the container part 65 and its die surface 808 engages the opening lever 343 it forces the lever against the surface 809 of the die member 782.

To permit this downward movement of the opening lever, the block 775 under the action of the descending clamping ring 792 moves downwardly, the springs 781 yielding to permit such movement, and the end of the opening lever 343 is thereby given an upward bend 811 (Fig. 6) as it becomes seated between the die surfaces 808 and 809. This curved part 811 is an arc of slightly greater diameter than the diameter of the corresponding circular wall 67 of the container part 65. The reason for this shape will become obvious as the description proceeds.

The die member 782 is provided with a perforation 812 (Figs. 40 and 42) into which the end of the pin 806 freely passes and its upper surface is relieved as at 813 (Figs. 40 and 43) to provide a shoulder 814. The clamping ring 792 is formed with a vertical wall 815 which cooperates with the shoulder 814 during the downward movement of the punch block to bend a portion of the opening lever. A part of the free end of the opening lever 343 at such time projects beyond the shoulder and over the recess 813 of the die member and lies directly beneath the projection adjacent the wall 815 of the ring 792 and as these die parts come together the projecting portion of the opening lever is bent over at right angles to form a finger hold 816 illustrated in Fig. 6.

Following these two lever shaping actions, the die block 785 ascends and the block 775 moves upwardly to normal position carrying the container part to the plane of the upper surface of the plate 777. To insure a stripping of the container part 65 from its position within the clamping ring 792, the foot 799 is given a sudden downward movement as the punch block 785 returns to its uppermost position.

To accomplish such a knockout operation, the button 804 is engaged by a knockout lever 817 (Fig. 8) which is pivoted on the block 787 and which operates in a manner identical with the operation of the lever 606. In the present instance the lever 817 is engaged by its cam which corresponds in every way to the cam 609 and which is secured to the inner face of the bar 610 for this purpose.

At the next operating station, the container part 65 and its opening lever is brought to rest for a final bending and positioning of opening lever relative to the side wall of the container part. The die block 469 at this station is provided with a central chamber 821 (Figs. 37 and 38) in which is positioned a draw ring 822 having a complete circular inner wall and a circular outer wall broken or recessed at 823. This draw ring encloses a circular pad 824 having relative movement within the ring and formed with a downwardly extending circular wall 825 enclosing in part a block 826 mounted in the chamber 821 and secured to the die block 469.

The pad 824 is loosely connected with the block 826 by a central bolt 827 secured to the pad and having an enlarged head 828 loosely positioned within an opening 829 formed centrally in the block 826. The pad 824 is normally held in a raised position by springs 831 interposed between the block 826 and the pad 824 and in such a position the head 828 of the bolt 827 strikes against a shoulder in the block 826 and forms a limiting stop.

The die block 469 (Figs. 37 and 38) is cut away at its upper surface on one side and there is positioned therein a bar 832 which is secured to the die block 469 by screws 833. A spacer strip 834 is mounted on the bar 832 and supports a plate 835 extending partially across the die block 469, the screws 833 holding the plate 835, the strip 834 and the bar 832 as a solid unit. The upper surface of the plate 835 is flush with the upper surface of the die block 469 and the ring 822 when in raised position is also flush, these three parts forming a smooth surface for the container part 65 to slide on during its entrance into and exit from the station.

The draw ring 822 carries downwardly extending pins 836 which are held in a collar 837 resting on a drawing rubber 838 confined between it and a collar 839. A bolt 841 passes centrally through the parts 837, 838 and 839 and is threadedly secured to the die block 469. A locknut 842 secured to the lower end of the bolt 841 clamps the parts together and places the drawing rubber 838 under compression, this being standard press construction.

Draw ring 822 is slotted at spaced radial points 843 (Figs. 38 and 39) and stripper blocks 844 are positioned therein being securely locked in place by screws 845. The upper surface of each stripper block 844 is flush with the upper surface of the draw ring 822 but the inner edges thereof extend inwardly into vertical slots 846 formed in the circular pad 824. These stripper blocks 844 assist in discharging the container part 65 from the die at this station as will be hereinafter fully explained.

The plate 835 adjacent the recess 823 in the draw ring 822 is cut away to form a clearance opening 847 for the lip 66 of the container part 65 and for the opening lever 343 which rest in position directly above.

The movable die parts of this station are carried in a punch block 851 (Figs. 8 and 37) which is provided with a stem 852 clamped within a block 853 adjustably positioned within a slot 854 formed in the slide head 55 adjacent the slot 788. An adjusting screw 855 cooperates with the block 853 and the slide head 55 for this purpose.

The punch block 851 is recessed in its lower surface as at 856 and a clamping ring 857 is seated therein being secured to the punch block by bolts 858. The ring 857 at its bottom end is cut away or recessed at 859 providing a chamber and one side wall is further recessed or cut away as at 861. A knockout pad 862 is positioned interiorly of the clamping ring 857 and is threadedly secured to the lower end of a sleeve 863 extending centrally through the punch block 851.

A cap 864 is threadedly secured over the upper end of the sleeve 863 and a spring 865 is positioned around the sleeve adjacent its cap being located within a recess 866 formed in the stem 852. This spring 865 is interposed between the lower edge of the cap 864 and the bottom of the recess 866 and holds the sleeve 863 and the punch pad 862 in its normal raised position which position is illustrated in Fig. 37.

The lower face 867 of the punch pad 862 cooperates with the walls of the chamber 859 to provide a closely fitting enclosure for the container part 65. A pin 868 is positioned centrally of the pad 862 and its enlarged head 869 is engaged by the lower end of a spring 871 located on the interior of the sleeve 863, the upper end of the spring engaging the cap 864. This spring normally holds the pin 868 projected downwardly from the pad 862, its head 869 at such time seating upon the pad.

As the slide head 55 moves downwardly carrying the punch block 851, the projecting pin 868 comes into contact with the container part 65 and holds it in position upon the draw ring 822. It is at this time that the feeding fingers 91 are withdrawn. Continued downward movement of the punch block carries the ring 857 over the container part 65, the rounded surface of the pad 862 engaging the top thereof. The lower edge of the ring 857 at this time clamps against the flange of the container part 65 and forces it directly against the draw ring 822 causing the latter to move downwardly under compression of the drawing rubber 838.

The upper surface of the circular pad 824 is of proper form and shape to snugly fit within the container part 65, and as the latter moves downwardly over this pad any confined air on the inside of the container part escapes through a vent opening 871 formed in the pad. The vent opening 871 communicates with an interior chamber 872 enclosed within the circular wall 825 of the pad 824 and the block 826 and air passing therethrough escapes through a vent opening 873 formed in the block 826.

During this depression of the draw ring 822 and the seating of the container part 65 over the circular pad 824, its lip 66 and the opening lever 343 pass downwardly and unobstructedly through the opening 847. Following the seating of the container part, continued downward movement of the punch block 851 further lowers the draw ring 822, the container part 65 and the circular pad 824, the springs 831 yielding at such a time.

Throughout such a movement the lip of the container part 65 and its attached opening lever engage the upper surface of the bar 832, this engagement being followed by a bending of the lug 66 at right angles. This bending action positions the opening lever 343 into a vertical plane, as the container part then rests within this station, where it is adjacent to and parallel with the vertical wall 67 of the container part 65, as illustrated in Fig. 7.

A slot 874 (Figs. 37 and 38) is formed in the upper edge and extends along the face of the bar 832 and provides a clearance for the clinched or riveted pivot end of the opening lever 343 as it moves from its horizontal to its vertical position during the bending of the lip 66 as just described.

On the return or upward movement of the punch block 851 the circular pad 824 is raised by its springs 831 permitting the container part 65 and the draw ring 822 to follow upwardly under action of the drawing rubber 838, until the circular pad is stopped by the head 828 of the bolt 827 seating against the block 826. Continued lifting of the punch block 851 permits further raising of the draw ring 822 by its drawing rubber 838 and the stripper blocks 844 move upwardly within their slots 846 forcing the container part to follow along with the rising clamping ring 857.

After the container part has been raised to the level of the die block 469, the draw ring stops moving but the punch block 851 continues to move upwardly. Near the end of its rising stroke the button 864 is given a quick downward movement by engagement with a knockout lever 875 (Fig. 8) pivoted in the block 853 whereupon the sleeve 863 causes the knockout pad 862 to project beyond the clamping ring 857 and strip off the container part 65 from within the chamber 859. This knockout lever 875 is operated in a manner identical with the operation of the lever 606 a cam corresponding in every respect to the cam 609 being fastened on the inner face of the bar 610 for this purpose.

Following the operation at the station just described, the fully formed container part 65 is engaged by the last pair of feeding fingers 91 and is moved over the die block 469 and on to the upper surface of an incline chute 876 (Figs. 11 and 37) formed in the block 105, guide walls 877 being formed therein and directing the discharge of the container part out of the machine, it sliding through the chute by the action of gravity.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A machine for producing lever opener container parts, comprising in combination means for cutting and forming an opening lever from a strip of sheet material, reciprocating means having oppositely movable grasping fingers for holding and advancing a succession of container parts, means for preparing a container part for the reception of said formed lever, and mechanism for assembling the lever on the container part.

2. A machine for producing lever opener container parts, comprising in combination feeding devices for advancing a strip of sheet material through the machine, means for cutting and forming an opening lever from said strip, reciprocating feeding devices for advancing a container part having a projecting lip through the machine, means for punching said container part for the reception of said formed lever, mechanism for assembling the lever on the container part and means for bending said lip.

3. A machine for producing lever opener container parts, comprising in combination means for cutting and forming an opening lever from a strip of sheet material, means for preparing a container part having a lateral lip for the reception of said formed lever, mechanism operating in the direction of the axis of said container part for assembling the lever on the container part, instrumentalities for securing said lever on said container part and means for bending said lip.

4. A machine for producing lever opener container parts, comprising in combination means for cutting and forming an opening lever from a strip of sheet material, means for preparing a container part having a projecting lip for the reception of said formed lever, mechanism operating transversely to said lip for assembling the lever on the container part, instrumentalities for securing said lever on said container part, and devices for bending said lip and attached lever into operable condition parallel with the flange of said container part.

5. In a machine for producing lever opener container parts, the combination of feeding devices for advancing a container part having a projecting lip, and a strip for an opening lever, in separated relationship, mechanism for arranging said parts in adjacent relationship and centering said lip relative to said mechanism, instrumentalities for securing said lever on said container part and means for bending said lip.

6. In a machine for producing lever opener container parts, the combination of feeding devices for advancing a container part having a projecting lip and a partially formed opening lever in separated relationship, mechanism for arranging said parts in adjacent relationship, means for turning the container part to bring said lip in line with the lever, instrumentalities for securing said lever on said container part, devices for completing the formation of said lever, and means for bending the lip to bring the lever in operable relation to said container part.

7. In a machine for producing lever opener container parts the latter having projecting lips, the combination of drawing dies adapted to operate on a strip of sheet material and having means to project a restricted portion thereof to form a protuberance, blanking dies for cutting an opening lever from said strip and including said protuberance, and mechanism for inserting the protuberance of said lever into an opening in the lip of a container part, and means for bending the lip.

8. In a machine for producing lever opener container parts the latter having projecting lips, the combination of drawing dies adapted to operate on a strip of sheet material and to project a restricted portion thereof to form a protuberance, blanking dies for cutting an opening lever from said strip and including said protuberance, mechanism for inserting the protuberance of said lever into an opening in the lip of a container part, instrumentalities for clinching the end of said protuberance over said container part to provide a pivotal connection for said lever and means for bending the lip with the lever pivoted thereon.

9. In a machine for producing lever opener container parts the latter having projecting lips, the combination of feeding devices for intermittently advancing a strip of sheet material through the machine, drawing dies adapted to operate while said strip is at rest for projecting restricted portions thereof to form protuberances, blanking dies for cutting opening levers from said strip so that each lever contains a single protuberance, feeding devices for intermittently advancing a container part through the machine, mechanism for inserting the protuberance of said lever into an opening formed in the lip of said container part while the latter is at rest, and means for bending said lip.

10. In a machine for producing lever opener container parts the latter having projecting lips, the combination of feeding devices for intermittently advancing a strip of sheet material through the machine, drawing dies adapted to operate while said strip is at rest for projecting restricted portions thereof to form protuberances, blanking dies for cutting opening levers from said strip so that each lever contains a single protuberance, feeding devices for intermittently advancing a container part through the machine, mechanism for inserting the protuberance of said lever into an opening formed in the projecting lip of said container part while the latter is at rest, instrumentalities for clinching the protuberance of said lever on said container part, and means for bending the lip with the lever clinched thereon.

11. A machine for producing lever opener container parts, comprising feeding rollers, means for moving said rollers to advance a strip of sheet material with an intermittent motion through the machine, cooperating dies arranged adjacent said strip and operating at each rest period for performing a drawing operation thereon, blanking dies positioned in advance of said drawing dies and operating at each rest period for cutting a part from said strip including a drawn section thereby providing an opening lever and leaving an open space in the strip and pilot means for centering said strip by engagement within said space.

12. A machine for producing lever opener container parts, comprising feeding rollers, means for moving said rollers to advance a strip of sheet material with an intermittent motion through an operating station, cooperating dies at said station for removing lever openers from said strip, pilot means adjacent said station for successively centering said strip in said dies by engagement within the space formed in said strip by the removal of a preceding lever opener, and means for separating said feeding rollers to permit such centering action.

13. A machine for producing lever opener container parts, comprising feeding rollers, means for moving said rollers to advance a strip of sheet material with an intermittent motion through the machine, cooperating dies arranged adjacent said strip and operating at each rest period for performing a drawing operation thereon, blanking dies positioned in advance of said drawing dies and operating at each rest period for cutting an opening lever from said strip, said lever embodying said drawn section, and cutting means arranged in advance of said blanking dies for removing the skeleton end of the strip following each movement of said feeding rollers.

14. A machine for producing lever opener container parts, comprising in combination primary feeding devices for advancing a container part into an assembling station, secondary feeding devices for advancing an opening lever through a confined passageway and toward the assembling station, and resilient means arranged in said passageway for holding said opening lever within its proper line of travel.

15. A machine for producing lever opener container parts, comprising in combination primary feeding devices for advancing a container part into an assembling station, a transfer arm located adjacent said station and having resilient holding fingers, secondary feeding devices for advancing an opening lever into said holding fingers, and means for moving said arm to position said opening lever within said assembling station.

16. A machine for producing lever opener container parts, comprising in combination primary feeding devices for advancing a container part into an assembling station, a transfer arm located adjacent said station and having resilient holding fingers, secondary feeding devices for advancing an opening lever into said holding fingers, means for moving said arm to position said opening lever within said assembling station, mechanism for assembling the lever on the container part at said station, and arm control devices including limit stops and a yielding connection between said arm and its moving means for effecting exact location of said transfer arm in lever receiving and lever assembling positions.

17. In a machine for producing lever opener container parts, the combination of feeding devices for advancing a container part having a perforated lip into an assembling station, a transfer arm located adjacent said station and adapted to present and hold an opening lever having a protuberance in axial alignment with the perforated lip of said container part, mechanism at said station for inserting the protuberance of the lever into the perforation of the container part, and instrumentalities for clinching the end of said protuberance over said lip whereby said opening lever is pivotally secured on said container part.

18. A machine for producing lever opener container parts, comprising in combination primary feeding devices for advancing a container part into an assembling station, means arranged along the line of travel of said container part for preparing it to receive an opening lever, secondary feeding devices for advancing an opening lever to a point adjacent said container part when at the assembling station, means for holding said container part at the assembling station in a predetermined position, a transfer arm for receiving said opening lever from said secondary feeding devices and presenting it in alignment with the positioned container part, and mechanism for assembling said opening lever on said container part.

19. A machine for producing lever opener container parts, comprising in combination primary feeding devices for advancing a container part into an assembling station, auxiliary feeding members including a circular, segmental rack and a gear sector for presenting container parts to said primary feeding devices, means arranged along the line of travel of said container part for preparing it to receive an opening lever, secondary feeding devices for advancing an opening lever to a point adjacent said container part when at the assembling station, and mechanism for assembling said opening lever on said container part.

20. In a machine for producing lever opener container parts, the combination of a circular segmental rack carrying pivoted feeding dogs, means for moving said rack back and forth to effect engagement on its forward stroke between said dogs and container parts introduced into the machine whereby said container parts are advanced in processional order, spaced bars located tangentially to the forward end of said rack and carrying pivoted feeding fingers, and means for moving said bars back and forth to effect engagement on their forward travel between said fingers and said container parts, whereby the latter are received from said rack and further advanced in processional order through the machine.

21. In a machine for producing container parts, the combination of a table, feeding devices for intermittently advancing a container part into and through a series of stations arranged along said table, said feeding devices comprising spaced bars reciprocable over the surface of said table, spaced feeding fingers pivotally mounted on said bars and adapted to intermittently engage said container part and move it from station to station during the forward reciprocation of said bars, and means for moving said fingers into and out of container part engagement.

22. In a machine for producing container parts, the combination of a table, feeding devices for intermittently advancing a container part into and through a series of stations arranged along said table, said feeding devices comprising spaced bars reciprocable over the surface of said table, spaced feeding fingers pivotally mounted on said bars and adapted to intermittently engage said container part and move it from station to station during the forward reciprocation of said bars, means for moving said fingers into and out of container part engagement, and holding members positioned at said stations for holding said container part at a station during disengagement of said fingers therefrom.

23. In a machine for producing container parts, the combination of a circular chute, a circular segmental rack moving adjacent said chute and having pivoted feeding dogs projecting therein, means for moving said rack back and forth to effect engagement on its forward stroke between its feed dogs and container parts within said chute whereby the latter are advanced in processional order, and devices projecting in said chute for holding said container parts during the backward movement of said feeding dogs.

24. A machine for producing lever opener container parts, comprising in combination, feeding devices for advancing through the machine a strip of sheet material from which opening levers are cut, other feeding devices for advancing through the machine a container part to which is subsequently secured a said opening lever, and means for preventing feeding of said strip in the absence of a container part within its feeding devices.

25. A machine for producing lever opener container parts, comprising in combination, feeding devices for advancing through the machine a strip of sheet material from which opening levers are cut, said devices including feeding rollers and actuating instrumentalities for rotating said rollers, clutch members interposed between said rollers and said instrumentalities, other feeding devices for advancing through the machine a container part to which is subsequently secured a said opening lever, and means cooperating with a container part while within its feeding devices for operating said clutch members to effect engagement between said rollers and their actuating instrumentalities thereby advancing said strip during proper feeding of said container part.

26. In a machine for producing lever opener container parts, the combination of feeding devices for advancing a container part through a series of operating stations, locating means at one of said stations for placing said container part in a predetermined position, perforating dies at said station for perforating said positioned container part, feeding devices for advancing an opening lever to a second or assembling station to which said perforated container part is brought, and instrumentalities at said assembling station for assembling said lever on said container part by inserting a pivot part of said lever within the perforation of said container part.

27. In a machine for producing lever opener container parts, the combination of feeding devices for advancing a container part having a projecting lip through a series of operating stations, locating means including oscillating fingers operating at one of said stations for engaging the lip of said container part and moving it into a predetermined position, perforating dies at said station for perforating said positioned container part, feeding devices for advancing an opening lever to a second or assembling station to which said perforated container part is brought, and instrumentalities at said assembling station for assembling said lever on said container part by inserting a pivot part of said lever within the perforation of said container part.

28. A container part locating mechanism comprising a pair of oscillating fingers positioned on opposite sides of the line of travel of a container part having a lateral projection, feeding devices for bringing said container part into position adjacent said fingers with its projection therebetween, and means for moving said fingers toward each other and in a circular path of travel to bring one of said fingers into engagement with the projection of said container part and to thereby move it into engagement with the other finger whereby said container part is located in a predetermined position.

29. In a machine for producing lever opener container parts, the combination of a table having an assembling station and a lever shaping station, feeding devices for advancing a container part having an opening lever pivotally secured thereto from the first to the second of said stations, die members located at said lever shaping station for shaping said opening lever to conform with a wall of said container part, and means cooperating with said die members to hold said opening lever and said container part in a predetermined position during such shaping operation.

30. In a machine for producing lever opener container parts, the combination of a table having an assembling station and a lever positioning station, feeding devices for advancing a container part having a laterally extending lip pivotally connected with an opening lever from the first to the second of said stations, and die members located at said lever positioning station for bending said lip to place said opening lever adjacent a wall of said container part and into operable condition.

31. In a machine for producing lever opener container parts the combination of a table having a plurality of operating stations, feeding devices moving over said table and advancing container parts having laterally extending lips therealong from station to station, mechanism at one station for centering a said container part by its lip and other mechanism for perforating and slotting said lip, mechanism at a second station for redrawing said container part to locate the slot of its lip partially within a side wall thereof, mechanism at a third station for assembling an opening lever on said container part and other mechanism for movably securing said lever to said laterally extending lip by forming a pivotal connection in said perforation, mechanism at a fourth station for shaping the opening lever to conform with the contour of the side wall of said container part, and mechanism at a fifth and last station for bending said lip and positioning the opening lever adjacent the side wall of said container part whereby the lever is in an operable condition to extend through said slot.

32. In a machine for producing lever opener container parts, the latter having projecting lips, the combination of devices for conjointly arranging a container part and a lever blank in assembled relation with said lip in line with said blank, means permanently joining said lip and said lever blank, and mechanism thereafter operating for bending said lip and lever parallel with the wall of the container part.

33. In a machine for producing lever opener container parts the latter having projecting lips, the combination of devices for conjointly arranging a container member and a lever member in assembled relation, means permanently uniting said lever and lip together, and mechanism thereafter operating to bend the lever and lip parallel with the wall of the container member.

34. In a machine for producing lever opener container parts the latter having projecting lips, the combination of feeding devices for arranging a container member and a lever member in adjacent relationship with the lip in line with the lever, and means operating in timed relation with said feeding means for uniting said lever and lip by a rivet integral with a said lever and means for bending the said lip.

JOHN M. HOTHERSALL.